(12) United States Patent
Ohnishi et al.

(10) Patent No.: US 9,440,629 B2
(45) Date of Patent: Sep. 13, 2016

(54) ELECTRIC BRAKE DEVICE

(71) Applicants: HONDA MOTOR CO., LTD., Minato-Ku, Tokyo (JP); NTN CORPORATION, Osaka-Shi, Osaka (JP)

(72) Inventors: Takaaki Ohnishi, Wako (JP); Hiroshi Nakano, Wako (JP); Kensuke Funada, Iwata (JP); Keisuke Kazuno, Iwata (JP)

(73) Assignees: Honda Motor Co., Ltd., Tokyo (JP); NTN Corporation, Osaka (JP)

( * ) Notice: Subject to any disclaimer, the term of this patent is extended or adjusted under 35 U.S.C. 154(b) by 369 days.

(21) Appl. No.: 14/348,276

(22) PCT Filed: Sep. 28, 2012

(86) PCT No.: PCT/JP2012/075121
§ 371 (c)(1),
(2) Date: Mar. 28, 2014

(87) PCT Pub. No.: WO2013/047765
PCT Pub. Date: Apr. 4, 2013

(65) Prior Publication Data
US 2014/0373526 A1 Dec. 25, 2014

(30) Foreign Application Priority Data
Sep. 30, 2011 (JP) ................................. 2011-217751

(51) Int. Cl.
*F15B 7/00* (2006.01)
*B60T 13/74* (2006.01)
(Continued)

(52) U.S. Cl.
CPC .............. *B60T 13/745* (2013.01); *B60T 7/042* (2013.01); *B60T 8/4081* (2013.01); *B60T 13/146* (2013.01); *B60T 17/088* (2013.01); *B60T 13/145* (2013.01)

(58) Field of Classification Search
CPC ... B60T 13/745; B60T 13/145; B60T 13/146
USPC ........................................................ 60/545
See application file for complete search history.

(56) References Cited

U.S. PATENT DOCUMENTS 4,653,815 A 3/1987 Agarwal et al.
5,569,025 A 10/1996 Bendel et al.
(Continued)

FOREIGN PATENT DOCUMENTS

CN 102056782 A 5/2011
EP 1970271 A1 9/2008
(Continued)

OTHER PUBLICATIONS

Extended European Search Report issued Mar. 10, 2015 with corresponding European Patent Application No. 12837588.8.
(Continued)

*Primary Examiner* — Nathaniel Wiehe
*Assistant Examiner* — Daniel Collins
(74) *Attorney, Agent, or Firm* — Carrier Blackman & Associates, P.C.; Joseph P. Carrier; William D. Blackman

(57) ABSTRACT

An electric brake device, in which the rotational drive force of an electric motor (72) drives a first slave piston and a second slave piston housed in a cylinder body and thereby generates brake fluid pressure, an actuator housing (172) is coupled to the cylinder body, and the mechanism housing part (173a) and a brake fluid encapsulating part in the cylinder body are partitioned by a sealing member, the actuator housing having a mechanism housing part (173a) for housing an actuator mechanism (74) for converting the rotational drive force of the electric motor (72) into the linear drive force for the first slave piston and the second slave piston; wherein the electric brake device is characterized in being provided with an interconnecting hole (179) for interconnecting the mechanism housing part (173a) and the atmosphere.

7 Claims, 11 Drawing Sheets

(51) Int. Cl.
  *B60T 8/40* (2006.01)
  *B60T 7/04* (2006.01)
  *B60T 17/08* (2006.01)
  *B60T 13/14* (2006.01)

(56) References Cited

U.S. PATENT DOCUMENTS

| | | | |
|---|---|---|---|
| 5,927,825 A | 7/1999 | Schenk et al. | |
| 6,102,494 A | 8/2000 | Volz et al. | |
| 6,932,356 B2 | 8/2005 | Gloaguen | |
| 8,226,176 B2 * | 7/2012 | Hatano | B60T 8/4081 303/115.2 |
| 8,550,573 B2 | 10/2013 | Hatano | |
| 8,833,072 B2 | 9/2014 | Sprocq et al. | |
| 2008/0290726 A1 | 11/2008 | Inoue et al. | |

FOREIGN PATENT DOCUMENTS

| | | |
|---|---|---|
| JP | H04-128966 U | 11/1992 |
| JP | H08-253124 A | 10/1996 |
| JP | H10-273037 A | 10/1998 |
| JP | 2000-168529 A | 6/2000 |
| JP | 2002-302051 A | 10/2002 |
| JP | 2010-007769 A | 1/2010 |
| JP | 2010-023594 A | 2/2010 |
| WO | 8809422 A1 | 12/1988 |
| WO | 9613416 A1 | 5/1996 |
| WO | 2010/106993 A1 | 9/2010 |
| WO | 2010106993 A1 | 9/2010 |

OTHER PUBLICATIONS

Office Action dated Dec. 10, 2015 issued in the corresponding European Patent Application No. 12837588.8.

Office Action issued in corresponding Japanese Patent Application No. 2013-536436 dated Oct. 27, 2015.

Office Action issued in corresponding Chinese Patent Application No. 2012-80047906.8 dated Sep. 28, 2015.

* cited by examiner

ELECTRIC BRAKE DEVICE

TECHNICAL FIELD

The present invention relates to an electric brake device which generates hydraulic brake pressure by rotational driving force generated by an electric motor when a brake manipulation unit is manipulated.

BACKGROUND ART

The vehicle brake system for use in a vehicle having a brake booster for enhancing the brake force when a brake pedal is depressed is widely known. For example, Patent Literature 1 discloses an electric brake actuator (electric booster device) using an electric motor as a boosting power source. In the electric brake actuator disclosed in Patent Literature 1, a shaft member moving back and forth in response to manipulation of a brake pedal is used as a main piston, and a cylindrical member sheathing the shaft member (the main piston) is used as a booster piston, and a hydraulic brake pressure is generated on the basis of a driving force inputted from the brake pedal to the shaft member (the main piston) and a driving force given by the electric motor to the cylindrical member (booster piston) for enhancing the tread force.

CITATION LIST PATENT LITERATURE

Patent Literature 1: Japanese Patent Laid-Open No. 2010-23594

SUMMARY OF INVENTION

Technical Problem

In the electric brake actuator disclosed in Patent Literature 1, a pressure chamber in a master cylinder filled with brake fluid and a housing (actuator housing) including an enclosing portion for a ball-screw mechanism have sealed structures. Therefore, when the booster piston and the main piston move in the direction away from the enclosing portion for the ball-screw mechanism, a portion of the ball-screw mechanism is pushed out of the enclosing portion, so that the volume inside the enclosing portion increases and the pressure inside the enclosing portion decreases. When the pressure inside the enclosing portion for the ball-screw mechanism decreases, it is necessary to take external air into the enclosing portion.

In addition, for example, when the internal temperature of the actuator housing varies with the ambient temperature of the electric brake actuator, the temperature of the enclosing portion for the ball screw mechanism also varies, so that the pressure inside the enclosing portion varies. Specifically, when the temperature of the enclosing portion falls, the internal pressure decreases. Therefore, when the temperature of the enclosing portion for the ball-screw mechanism falls, it is also necessary to take external air into the enclosing portion. However, Patent Literature 1 discloses no arrangement for taking in external air when the pressure inside the enclosing portion for the ball-screw mechanism decreases.

If the external air cannot be preferably taken in even in the case where the internal pressure of the enclosing portion for the ball-screw mechanism decreases, the decreased internal pressure of the enclosing portion is maintained, so that, in particular, when the pressure chamber in the master cylinder is pressurized, the pressure difference between the pressure chamber in the master cylinder and the enclosing portion for the ball-screw mechanism causes problems such as water-drop intake or sealing imperfection of a sealing member with which the pressure chamber and the enclosing portion are partitioned.

In view of above, the object of the present invention is to provide an electric brake device for a vehicle which can preferably take in external air according to decrease in the internal pressure and can suppress occurrence of fluid leakage and the like.

Solution to Problem

In order to accomplish the above object, an electric brake device according to the present invention is provided. In the electric brake device, a brake pressure is generated by actuating, by a rotational driving force of an electric motor, a hydraulic control piston enclosed in a cylinder body, and an actuator housing including a mechanism-enclosing portion which encloses an actuator mechanism converting the rotational driving force around an output shaft of the electric motor into a linear driving force of the hydraulic control piston is connected to the cylinder body, and a brake-fluid enclosing portion in the cylinder body is partitioned off from the mechanism-enclosing portion with a sealing member. The electric brake device according to the present invention comprises a communication hole which realizes communication between the mechanism-enclosing portion and the atmosphere.

According to the present invention, it is possible to enable the cylinder body and the mechanism-enclosing portion to communicate with the atmosphere, where the cylinder body is filled with the brake fluid and the mechanism-enclosing portion is partitioned off with the sealing member. Therefore, when the pressure in the mechanism-enclosing portion decreases, the external air can be preferably taken into the mechanism-enclosing portion.

An additional characteristic feature of the present invention is that the flow of condensed water in the communication hole is blocked with the film of a material which has a water proofing property and a moisture permeability property and through which air can pass.

According to the above additional characteristic feature, it is possible to block the flow of condensed water in the communication hole, and make the communication hole block pass only the air. Therefore, it is possible to prevent intrusion of condensed water such as rain water through the communication hole.

Another additional characteristic feature of the present invention is that the communication hole is formed to realize communication between the mechanism-enclosing portion and an insertion hole into which an attachment fastening member for fixing the actuator housing to a vehicle is inserted.

According to the above additional characteristic feature, the mechanism-enclosing portion can communicate with the atmosphere through the insertion hole, into which the attachment fastening member for fixing the electric brake actuator to the vehicle is inserted. Therefore, when the pressure in the mechanism-enclosing portion decreases, the external air can be preferably taken into the mechanism-enclosing portion.

A further additional characteristic feature of the present invention is that an opening of the communication hole on the mechanism-enclosing portion side is formed vertically above the sealing member.

According to the above additional characteristic feature, since the opening of the communication hole on the mechanism-enclosing portion side is formed vertically above the sealing member, it is possible to prevent the communication hole from being closed on the mechanism-enclosing portion side by the brake fluid which flows beyond the sealing member.

Effect of Invention

According to the present invention, it is possible to provide an electric brake device which can preferably take in external air according to decrease in the internal pressure and can suppress occurrence of fluid leakage and the like.

DESCRIPTION OF EMBODIMENTS

Figure 1:
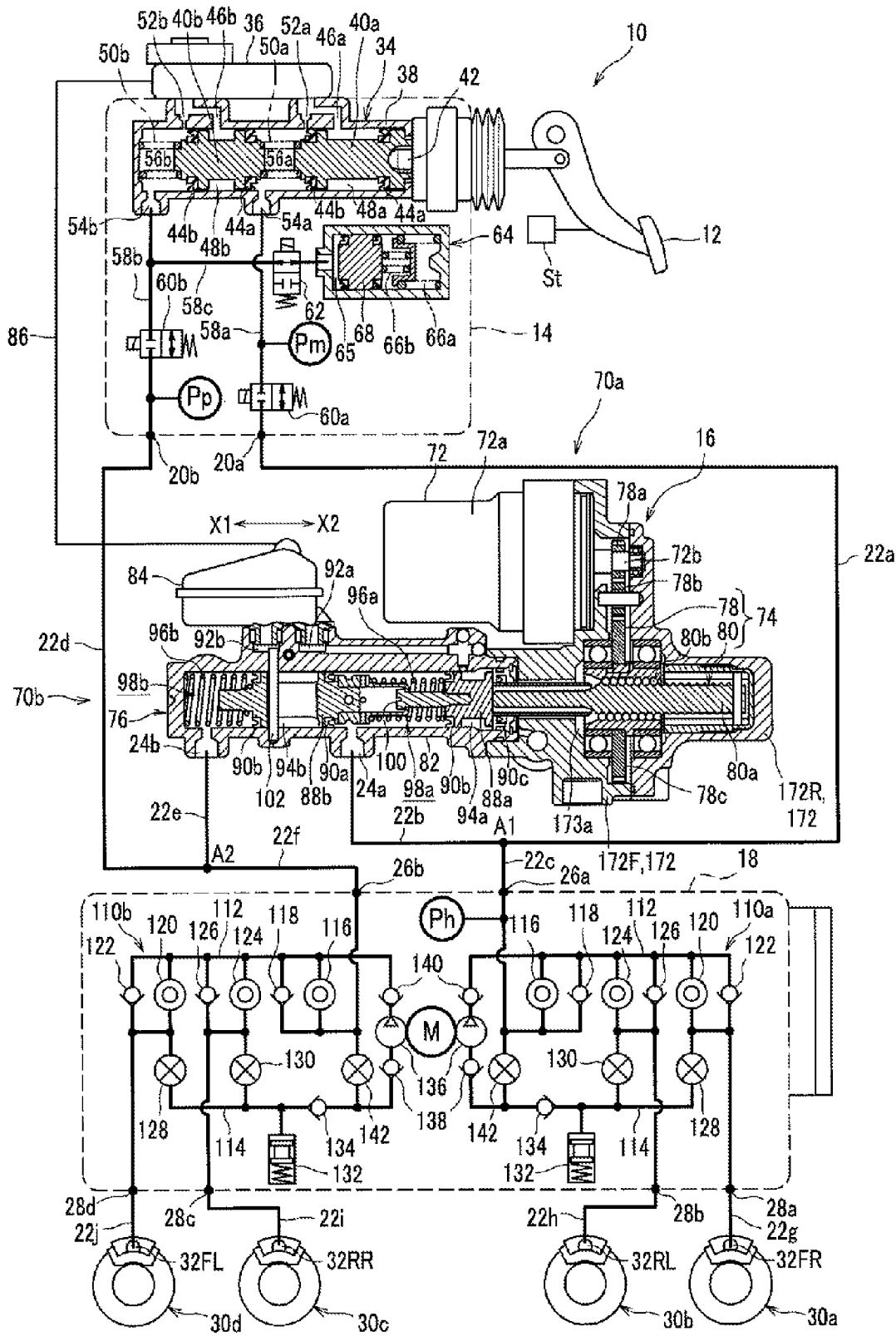
FIG. 1 is a structural diagram of a vehicle brake system in which an electric brake device according to the present embodiment is provided.

An embodiment of the present invention is explained below with reference to the accompanying drawings as needed. FIG. 1 schematically illustrates the arrangement of a vehicle brake system containing an electric brake device according to the embodiment of the present invention.

The vehicle brake system 10 illustrated in FIG. 1 includes both of a brake-by-wire system for normal use and a conventional hydraulic brake system for fail-safe. The brake is operated by transmission of an electric signal in the brake-by-wire system, and by transmission of hydraulic pressure in the conventional hydraulic brake system.

Specifically, as illustrated in FIG. 1, the vehicle brake system 10 is basically constituted by a hydraulic-pressure generator (input apparatus) 14, a pedal-stroke sensor St, an electric brake actuator (electric brake device) 16, and a vehicle-behavior stabilizing apparatus 18, which are separately arranged. When a brake manipulation unit such as a brake pedal 12 is manipulated by an operator, the manipulation is inputted into the input apparatus 14. The pedal-stroke sensor St detects the amount of manipulation (stroke) of the brake pedal 12 when the brake pedal 12 is depressed. The electric brake actuator 16 controls (generates) hydraulic brake pressure. The vehicle-behavior stabilizing apparatus 18 assists in stabilization of the vehicle behavior. Hereinafter, the vehicle-behavior stabilizing apparatus 18 is referred to as the VSA (vehicle stability assist) apparatus. (VSA is a registered trademark.)

The input apparatus 14, the electric brake device 16, and the VSA apparatus 18 are connected through hydraulic paths formed with tubular members such as hoses or tubes, and the input apparatus 14 and the electric brake device 16 are electrically connected through wiring harness (not shown) so as to constitute the brake-by-wire system.

In the hydraulic paths, a connection port 20a of the input apparatus 14 is connected to a connection point A1 (which is indicated on the slightly below the center of FIG. 1 and regarded as a reference point) through a first piping tube 22a, an outlet port 24a of the electric brake device 16 is also connected to the connection point A1 through a second piping tube 22b, and an inlet port 26a of the VSA apparatus 18 is connected to the connection point A1 through a third piping tube 22c.

In addition, another connection port 20b of the input apparatus 14 is connected to another connection point A2 (which is regarded as another reference point) through a fourth piping tube 22d, another outlet port 24b of the electric brake device 16 is also connected to the connection point A2 through a fifth piping tube 22e, and another inlet port 26b of the VSA apparatus 18 is connected to the connection point A2 through a sixth piping tube 22f.

The VSA apparatus 18 has a plurality of outlet ports 28a to 28d. The first outlet port 28a is connected through a seventh piping tube 22g to a wheel cylinder 32FR in a disk brake mechanism 30a arranged in the right front wheel, the second outlet port 28b is connected through an eighth piping tube 22h to a wheel cylinder 32RL in a disk brake mechanism 30b arranged in the left rear wheel, the third outlet port 28c is connected through a ninth piping tube 22i to a wheel cylinder 32RR in a disk brake mechanism 30c arranged in the right rear wheel, and the fourth outlet port 28d is connected through a tenth piping tube 22j to a wheel cylinder 32FL in a disk brake mechanism 30d arranged in the left front wheel.

In the above arrangement, the brake fluid is supplied to the wheel cylinders 32FR, 32RL, 32RR, and 32FL in the disk brake mechanisms 30a to 30d through the piping tubes 22g to 22j connected to the outlet ports 28a to 28d, respectively. Therefore, when the hydraulic pressure in the wheel cylinders 32FR, 32RL, 32RR, and 32FL rises, the wheel cylinders 32FR, 32RL, 32RR, and 32FL operate, and exert braking force on the respectively corresponding wheels (i.e., the right front wheel, the left rear wheel, the right rear wheel, and the left front wheel).

The vehicle brake system 10 can be mounted on each type of vehicles including the automobiles driven by only an engine (internal-combustion-engine), hybrid electric vehicles, electric vehicles, and fuel-cell vehicles. In addition, the vehicle brake system 10 is not limited by the type of driving of the vehicle, and can be mounted on vehicles of any driving type, for example, the front-wheel drive, the rear-wheel drive, or the four-wheel drive.

The input apparatus 14 includes a master cylinder 34 and a first reservoir 36 which is attached to the master cylinder 34. The master cylinder 34 is a tandem type, and can generate hydraulic pressure in response to manipulation of the brake pedal 12 by the operator. The master cylinder 34 has a cylinder tube 38, in which two pistons 40a and 40b are arranged in such a manner that the two pistons 40a and 40b are a predetermined distance apart from each other and slidable along the axial direction of the cylinder tube 38. The one 40a of the two pistons is arranged nearer to the brake pedal 12, and connected to the brake pedal 12 through a pushrod 42. The other 40b of the two pistons is arranged farther from the brake pedal 12 than the one 40a of the two pistons.

A pair of cup seals 44a and 44b are attached to the outer wall of each of the two pistons 40a and 40b by annular step portions. In addition, back chambers 48a and 48b are respectively formed in the gaps between the cup seals 44a and 44b on the two pistons 40a and 40b, and respectively communicate with supply ports 46a and 46b, which are explained later. Further, a spring member 50a is arranged between the pistons 40a and 40b, and another spring member 50b is arranged between the piston 40b and a side edge portion of the cylinder tube 38. Alternatively, the cup seals 44a and 44b may be attached on the inner wall of the cylinder tube 38.

Moreover, the two supply ports 46a and 46b, two relief ports 52a and 52b, and two output ports 54a and 54b are arranged in the cylinder tube 38 in the master cylinder 34. In this case, the supply port 46a and 46b and the relief ports 52a and 52b are arranged such that each of the supply ports 46a and 46b and one of the relief ports 52a and 52b join and communicate with a reservoir chamber (not shown) in the first reservoir 36.

Further, a second pressure chamber 56a and a first pressure chamber 56b are realized in the cylinder tube 38 in the master cylinder 34. Hydraulic pressure corresponding to the tread force with which the brake pedal 12 is depressed by the operator is generated in the first and second pressure chambers 56b and 56a. The second pressure chamber 56a communicates with the connection port 20a through a second hydraulic path 58a, and the first pressure chamber 56b communicates with the other connection port 20b through a first hydraulic path 58b.

In addition, a pressure sensor Pm is arranged on the upstream side of the second hydraulic path 58a between the master cylinder 34 and the connection port 20a, and a second shutoff valve 60a realized by a normally-open solenoid valve is arranged on the downstream side of the second hydraulic path 58a. The pressure sensor Pm measures the hydraulic pressure on the upstream side of the second hydraulic path 58a (i.e., on the master cylinder 34 side of the second shutoff valve 60a in the second hydraulic path 58a).

Further, a first shutoff valve 60b realized by a normally-open solenoid valve is arranged on the upstream side of the first hydraulic path 58b between the master cylinder 34 and the connection port 20b, and a pressure sensor Pp is arranged on the downstream side of the first hydraulic path 58b. The pressure sensor Pp detects the hydraulic pressure on the downstream side of the first shutoff valve 60b (i.e., on the wheel cylinders 32FR, 32RL, 32RR, and 32FL side of the first shutoff valve 60b in the first hydraulic path 58b).

The normally-open solenoid valves realizing the first and second shutoff valves 60b and 60a are valves in which the normal position of the valve element (i.e., the position of the valve element when the valves are unenergized) is open. FIG. 1 shows the closed states of the first and second shutoff valves 60b and 60a, in which the solenoids in the first and second shutoff valves 60b and 60a are energized so that the valve elements (not shown) are activated.

Further, a hydraulic branch path 58c, which branches off from the first hydraulic path 58b, is arranged in the first hydraulic path 58b between the master cylinder 34 and the first shutoff valve 60b, and a third shutoff valve 62 and a stroke simulator 64 are connected in series to the hydraulic branch path 58c. The third shutoff valve 62 is realized by a normally-closed solenoid valve. The normally-closed solenoid valve realizing the third shutoff valve 62 is a valve in which the normal position of the valve element (i.e., the position of the valve element when the valve is unenergized) is closed. FIG. 1 shows the open state of the third shutoff valve 62 in which the solenoid in the third shutoff valve 62 is energized so that the valve element (not shown) is activated.

This stroke simulator 64 is a device which generates a brake stroke and reaction force in response to a manipulation of the brake pedal 12 during the break-by-wire control for making the operator feel as if braking force were directly generated by the tread force. The stroke simulator 64 is arranged on the master cylinder 34 side of the first shutoff valve 60b in the first hydraulic path 58b. A hydraulic chamber 65, which communicates with the hydraulic branch path 58c, is arranged in the stroke simulator 64 such that the stroke simulator 64 can absorb, through the hydraulic chamber 65, the brake fluid delivered from the second pressure chamber 56b in the master cylinder 34.

In addition, the stroke simulator 64 includes first and second return springs 66a and 66b and a simulator piston 68. The first and second return springs 66a and 66b are arranged in series, and the simulator piston 68 is energized by the first and second return springs 66a and 66b. The spring constant of the first return spring 66a is great, and the spring constant of the second return spring 66b is small. The first and second return springs 66a and 66b and the simulator piston 68 are arranged in such a manner that the increase rate of the pedal reaction force is low in the beginning stage of depression of the brake pedal 12, and the pedal reaction force becomes strong in the later stage of the depression of the brake pedal 12 and the operator feels a pedal feeling equivalent to the pedal feeling with the conventional master cylinder.

The hydraulic paths can be roughly divided into first and second hydraulic routes 70b and 70a. The second hydraulic route 70a connects the second pressure chamber 56a in the master cylinder 34 to the wheel cylinders 32FR and 32RL, and the first hydraulic route 70b connects the first pressure chamber 56b in the master cylinder 34 to the wheel cylinders 32RR and 32FL.

The second hydraulic route 70a is constituted by the second hydraulic path 58a connecting the outlet port 54a of the master cylinder 34 (i.e., the outlet port 54a of the cylinder tube 38) to the connection port 20a in the input apparatus 14, the piping tubes 22a and 22b connecting the connection port 20a of the input apparatus 14 to the outlet port 24a of the electric brake device 16, the piping tubes 22b and 22c connecting the outlet port 24a of the electric brake device 16 to the inlet port 26a of the VSA apparatus 18, and the piping tubes 22g and 22h respectively connecting the outlet ports 28a and 28b of the VSA apparatus 18 to the wheel cylinders 32FR and 32RL.

The first hydraulic route 70b is constituted by the first hydraulic path 58b connecting the outlet port 54b of the master cylinder 34 (i.e., the outlet port 54b of the cylinder tube 38) to the connection port 20b in the input apparatus 14, the piping tubes 22d and 22e connecting the connection port 20b of the input apparatus 14 to the outlet port 24b of the electric brake device 16, the piping tubes 22e and 22f connecting the outlet port 24b of the electric brake device 16 to the inlet port 26*b* of the VSA apparatus 18, and the piping tubes 22*i* and 22*j* respectively connecting the outlet ports 28*c* and 28*d* of the VSA apparatus 18 to the wheel cylinders 32RR and 32FL.

The electric brake device 16 includes an actuator mechanism 74 including an electric motor 72, and a cylinder mechanism 76 which is actuated by the actuator mechanism 74.

The actuator mechanism 74 contains a gear mechanism (deceleration mechanism) 78 and a ball-screw structure 80. The gear mechanism 78 is arranged on the output shaft 72*b* side of the electric motor 72, has multiple gears, and transmits the rotational driving force of the electric motor 72 by engagement of the multiple gears. The ball-screw structure 80 is constituted by a ball-screw shaft 80*a* and balls 80*b*. The rotational driving force is transmitted to the ball-screw structure 80 through the gear mechanism 78, and the ball-screw shaft 80*a* moves back and forth along the axial direction by the transmitted rotational driving force.

In the present embodiment, the ball-screw structure 80, together with the gear mechanism 78, is enclosed in a mechanism-enclosing portion 173*a* of an actuator housing 172.

The cylinder mechanism 76 includes a cylinder body 82 and a second reservoir 84. The cylinder body 82 has an approximately cylindrical shape, and the second reservoir 84 is directly attached to the cylinder body 82. The second reservoir 84 is arranged to be connected through a piping tube 86 to the first reservoir 36 (which is attached to the master cylinder 34 in the input apparatus 14) such that the brake fluid reserved in the first reservoir 36 is supplied to the second reservoir 84 through the piping tube 86. A reservoir for reserving the brake fluid may be arranged in the piping tube 86. The actuator housing 172 is constituted by a housing body 172F and a housing cover 172R. The electric brake device 16 is constructed by coupling the cylinder body 82 to the actuator housing 172, where the cylinder body 82 has a cylindrical shape. The cylinder body 82 is coupled to the actuator housing 172 by fitting an open edge portion (open end portion) of the cylinder body 82 into the actuator housing 172. The construction of the actuator housing 172 and the portion in which the cylinder body 82 and the actuator housing 172 are coupled will be explained in detail later.

In the cylinder body 82, a second slave piston 88*a* and a first slave piston 88*b* are slidably arranged in such a manner that the first and second slave pistons 88*b* and 88*a* are a predetermined distance apart from each other along the direction of the axis of the cylinder body 82. The second slave piston 88*a* is arranged close to the ball-screw structure 80 in contact with an end portion of the ball-screw shaft 80*a* such that the second slave piston 88*a* is displaced integrally with the ball-screw shaft 80*a* in the direction indicated by the arrow X1 or X2. The first slave piston 88*b* is arranged more apart from the ball-screw structure 80 than the second slave piston 88*a*. In the present embodiment, the second slave pistons 88*a* and first slave piston 88*b* realize the hydraulic control piston described in the appended claims.

In addition, the electric motor 72 in the present embodiment is arranged to be covered by a motor casing 72*a* which is formed separately from the cylinder body 82 in such a manner that the output shaft 72*b* is approximately parallel to the slide direction (axial direction) of the first and second slave pistons 88*b* and 88*a*. That is, the electric motor 72 is arranged in such a manner that the axial direction of the output shaft 72*b* is approximately parallel to the axial direction of the hydraulic control pistons. Further, the electric motor 72 is formed such that the drive rotation of the output shaft 72*b* is transmitted to the ball-screw structure 80 through the gear mechanism 78.

The gear mechanism 78 is constituted by three gears, first, second, and third gears 78*a*, 78*b*, and 78*c*. The first gear 78*a* is attached to the output shaft 72*b* of the electric motor 72, the second gear 78*b* transmits the rotation of the third gear 78*c*, and the third gear 78*c* causes the balls 80*b* to rotate around the axis of the ball-screw shaft 80*a*, where the balls 80*b* moves back and forth the ball-screw shaft 80*a* along the direction of the axis of the ball-screw shaft 80*a*. Therefore, the axis of rotation of the third gear 78*c* is the axis of rotation of the ball-screw shaft 80*a*, and becomes approximately parallel to the slide direction (axial direction) of the hydraulic control pistons (the second and first slave pistons 88*a* and 88*b*). As explained above, the output shaft 72*b* of the electric motor 72 is approximately parallel to the axial direction of the hydraulic control pistons. Therefore, the output shaft 72*b* of the electric motor 72 is approximately parallel to the axis of rotation of the third gear 78*c*.

Thus, in the case where the axis of rotation of the second gear 78*b* is arranged to be approximately parallel to the output shaft 72*b* of the electric motor 72, the output shaft 72*b* of the electric motor 72, the axis of rotation of the second gear 78*b*, and the axis of rotation of the third gear 78*c* are arranged approximately parallel. According to the above arrangement, the actuator mechanism 74 in the present embodiment converts the rotational drive force of the output shaft 72*b* of the electric motor 72 to back-and-forth drive force (linear drive force) of the ball-screw shaft 80*a*. Since the second slave piston 88*a* and the first slave piston 88*b* are driven by the ball-screw shaft 80*a*, the actuator mechanism 74 converts the rotational drive force of the output shaft 72*b* of the electric motor 72 to back-and-forth drive force (linear drive force) of the hydraulic control pistons (the second slave piston 88*a* and the first slave piston 88*b*). In addition, the mechanism-enclosing portion, which encloses the ball-screw structure 80, is indicated by the reference 173*a*.

A pair of slave cup seals 90*a* and 90*b* are respectively attached to the outer peripheral surfaces of the annular step portions of the first slave piston 88*b*. In addition, a first back chamber 94*b*, which communicates with a reservoir port 92*b*, is formed between the slave cup seals 90*a* and 90*b*. The first back chamber 94*b* and the reservoir port 92*b* are described later. Further, a second return spring 96*a* is arranged between the first and second slave pistons 88*b* and 88*a*, and a first return spring 96*b* is arranged between the first slave piston 88*b* and the side edge portion of the cylinder body 82.

Furthermore, an annular guide piston 90*c* is arranged on the rear side of the second slave piston 88*a* as a sealing member which closes the cylinder body 82. The guide piston 90*c* forms a fluid-tight seal between the outer peripheral surface of the second slave piston 88*a* and the mechanism-enclosing portion 173*a*, and guides the second slave piston 88*a* such that the second slave piston 88*a* can move along the direction of the axis of the second slave piston 88*a*. In addition, it is preferable that a slave cup seal (not shown) be attached to the inner peripheral surface of the guide piston 90*c* (through which the second slave piston 88*a* is inserted) such that a fluid-tight seal is formed between the second slave piston 88*a* and the guide piston 90*c*. Further, a slave cup seal 90*b* is arranged by an annular step portion on the forward side of the outer peripheral surface of the second slave piston 88*a*. According to the above arrangement, the brake fluid with which the inside of the cylinder body 82 is filled is sealed in the cylinder body 82 by the guide piston 90c, and does not flow to the actuator housing 172 side. In addition, a second back chamber 94a communicating with a reservoir port 92a is formed between the guide piston 90c and the slave cup seal 90b on the second slave piston 88a. The second back chamber 94a and the reservoir port 92a will be described later.

The two reservoir ports 92a and 92b and the two outlet ports 24a and 24b are arranged in the cylinder body 82 in the cylinder mechanism 76. In this case, the reservoir ports 92a and 92b are arranged to communicate with a reservoir chamber (not shown) in the second reservoir 84.

In addition, first and second hydraulic chambers 98b and 98a are arranged in the cylinder body 82. The second hydraulic chamber 98a controls the hydraulic brake pressure outputted from the outlet port 24a to the wheel cylinders 32FR and 32RL, and the first hydraulic chamber 98b controls the hydraulic brake pressure outputted from the outlet port 24b to the wheel cylinders 32RR and 32FL.

In the above arrangement, the first and second back chambers 94b and 94a and the first and second hydraulic chambers 98b and 98a in the cylinder body 82 are spaces which are filled with the brake fluid, and the back chambers 94b and 94a and the hydraulic chambers 98b and 98a are fluid tightly (and air tightly) separated from the mechanism-enclosing portion 173a in the actuator housing 172 by the guide piston 90c (which functions as the sealing member). The manner of attaching the guide piston 90c to the cylinder body 82 is not specifically limited. For example, the guide piston 90c may be attached with a circlip (not shown).

A restriction means 100 which restricts the maximum strokes (the maximum displacement) and the minimum strokes (the minimum displacement) of the first and second slave pistons 88b and 88a is arranged between the first and second slave pistons 88b and 88a. In addition, a stopper pin 102 is arranged in the first slave piston 88b. The stopper pin 102 restricts the slidable range of the first slave piston 88b, and prevents overreturn of the first slave piston 88b toward the second slave piston 88a. Therefore, when the braking operation is backed up with the hydraulic brake pressure generated by the master cylinder 34, it is possible to prevent occurrence of a failure in one of the hydraulic routes even when the other of the hydraulic routes fails.

The VSA apparatus 18 has a known configuration and includes first and second brake systems 110b and 110a. The second brake system 110a controls the second hydraulic route 70a connected to (the wheel cylinders 32FR and 32RL in) the disk brake mechanisms 30a and 30b in the right front wheel and the left rear wheel, and the first brake system 110b controls the first hydraulic route 70b connected to (the wheel cylinders 32RR and 32FL in) the disk brake mechanisms 30c and 30d in the right rear wheel and the left front wheel. Alternatively, the second brake system 110a may be constituted by hydraulic routes connected to the disk brake mechanisms arranged for the right front wheel and the left front wheel, and the first brake system 110b may be constituted by hydraulic routes connected to the disk brake mechanisms arranged for the right rear wheel and the left rear wheel. Further alternatively, the second brake system 110a may be constituted by hydraulic routes connected to the disk brake mechanisms arranged for the right front wheel and the right rear wheel, and the first brake system 110b may be constituted by hydraulic routes connected to the disk brake mechanisms arranged for the left front wheel and the left rear wheel.

Since the first and second braking systems 110b and 110a have identical structures, identical reference numbers are assigned to equivalent elements in the first and second braking systems 110b and 110a in FIG. 1. The following explanations are focused on the second braking system 110a, and the explanations on the first braking system 110b are indicated in parentheses.

The second braking system 110a (or the first braking system 110b) includes the first and second common hydraulic paths 112 and 114, which are common to the wheel cylinders 32FR and 32RL (or common to the wheel cylinders 32RR and 32FL). The VSA apparatus 18 includes a regulator valve 16, first, second, and third check valves 118, 122, and 126, and first and second in-valves 120 and 124. The regulator valve 116 is realized by a normally-open solenoid valve, and arranged between the inlet port 26a and the first common hydraulic path 112. The first check valve 118 is arranged parallel with the above regulator valve 116, and allows passage of the brake fluid from the inlet port 26a side to the first common hydraulic path 112 side (and stops passage of the brake fluid from the first common hydraulic path 112 side to the inlet port 26a side). The first in-valve 120 is realized by a normally-open solenoid valve, and arranged between the first common hydraulic path 112 and the first outlet port 28a. The second check valve 122 is arranged parallel with the above first in-valve 120, and allows passage of the brake fluid from the first outlet port 28a side to the first common hydraulic path 112 side (and stops passage of the brake fluid from the first common hydraulic path 112 side to the first outlet port 28a side). The second in-valve 124 is realized by a normally-open solenoid valve, and arranged between the first common hydraulic path 112 and the second outlet port 28b. The third check valve 126 is arranged parallel with the above second in-valve 124, and allows passage of the brake fluid from the second outlet port 28b side to the first common hydraulic path 112 side (and stops passage of the brake fluid from the first common hydraulic path 112 side to the second outlet port 28b side).

Further, the VSA apparatus 18 includes first and second out-valves 128 and 130, a reservoir 132, a fourth check valve 134, a pump 136, suction valves 138 and 142, a discharge valve 140, and a motor M. The first out-valve 128 is realized by a normally-closed solenoid valve, and arranged between the first outlet port 28a and the second common hydraulic path 114. The second out-valve 130 is realized by a normally-closed solenoid valve, and arranged between the second outlet port 28b and the second common hydraulic path 114. The reservoir 132 is connected to the second common hydraulic path 114. The fourth check valve 134 is arranged between the first common hydraulic path 112 and the second common hydraulic path 114, and allows passage of the brake fluid from the second common hydraulic path 114 side to the first common hydraulic path 112 side (and stops passage of the brake fluid from the first common hydraulic path 112 side to the second common hydraulic path 114 side). The pump 136 is arranged between the fourth check valve 134 and the first common hydraulic path 112, and supplies the brake fluid from the second common hydraulic path 114 side to the first common hydraulic path 112 side. The suction valve 138 and the discharge valve 140 are respectively arranged on the front and rear sides of the pump 136. The motor M drives the pump 136. The suction valve 142 is realized by a normally-closed solenoid valve, and arranged between the second common hydraulic path 114 and the inlet port 26a.

Furthermore, a pressure sensor Ph is arranged on the hydraulic path close to the inlet port 26a in the second braking system 110a, and detects the pressure of the brake fluid which is delivered from the outlet port 24a of the electric brake device 16 and controlled in the second hydraulic pressure chamber 98a in the electric brake device 16. The detection signal from each of the pressure sensors Pm, Pp, and Ph is supplied to the detection signal to a controller (not shown). The VSA apparatus 18 can also perform ABS (antilock brake system) control as well as the VSA (vehicle stability assist) control, although an ABS apparatus having only the ABS function, instead of the VSA apparatus 18, may be connected. The vehicle brake system 10 according to the present embodiment is basically constructed as above. The operations and advantages of the vehicle brake system 10 are explained below.

During normal operation of the vehicle brake system 10, the first and second shutoff valves 60b and 60a (respectively realized by normally-open solenoid valves) are energized to be closed, and the third shutoff valve 62 (realized by a normally-closed solenoid valve) is energized to be opened. Since the first and second hydraulic routes 70b and 70a are closed by the first and second shutoff valves 60b and 60a, the hydraulic brake pressure generated in the master cylinder 34 in the input apparatus 14 is not transmitted to the wheel cylinders 32FR, 32RL, 32RR, and 32FL in the disk brake mechanisms 30a to 30d.

At this time, the hydraulic brake pressure generated in the second pressure chamber 56b in the master cylinder 34 is transmitted to the hydraulic pressure chamber 65 in the stroke simulator 64 through the hydraulic branch path 58c and the third shutoff valve 62 (which is open). The hydraulic brake pressure transmitted to the hydraulic pressure chamber 65 causes the simulator piston 68 to move against the spring force produced by the first and second return springs 66a and 66b. Therefore, a stroke of the brake pedal 12 is allowed, and the hydraulic brake pressure in the hydraulic pressure chamber 65 generates dummy pedal reaction force, and imparts the dummy pedal reaction force to the brake pedal 12, so that a normal brake feel is provided to the operator without causing a sense of incongruity.

In the case where the vehicle brake system 10 is arranged as above, when the controller (not shown) detects depression of the brake pedal 12 by the operator, the controller activates the electric motor 72 in the electric brake device 16 so as to energize the actuator mechanism 74, and causes displacement of the first and second slave pistons 88b and 88a toward the direction indicated by the arrow X1 in FIG. 1, against the spring force generated by the first and second return springs 96b and 96a. The displacement of the first and second slave pistons 88b and 88a presses the brake fluid in the first and second hydraulic pressure chambers 98b and 98a in such a manner that the brake fluid in the first and second hydraulic pressure chambers 98b and 98a balances and a desired hydraulic brake pressure is generated in the first and second hydraulic chambers 98b and 98a.

Specifically, the control means (not shown) calculates the amount of depression of the brake pedal 12 (i.e., the brake depression amount) on the basis of a value obtained by detection by the pedal-stroke sensor St, and sets a target value of the hydraulic brake pressure (i.e., the target hydraulic pressure) on the basis of the amount of depression (brake manipulation amount) in consideration of the regenerative braking force, and causes the electric brake device 16 to generate the hydraulic pressure which is set as above. Then, the hydraulic brake pressure generated by the electric brake device 16 is applied through the inlet ports 26a and 26b to the VSA apparatus 18. That is, when the brake pedal 12 is manipulated, the electric motor 72 is rotationally driven in response to an electric signal, the first and second slave pistons 88b and 88a are actuated by the rotational drive force of the electric motor 72, so that the hydraulic brake pressure corresponding to the amount of manipulation of the brake pedal 12 is generated and applied to the VSA apparatus 18. The electric signals in the present embodiment are, for example, a signal for supplying electric power to the electric motor 72 and control signals for controlling the electric motor 72.

The manipulation-amount detection means, which detects the amount of depression of the brake pedal 12, is not limited to the pedal-stroke sensor St, and may be realized by any sensor which can detect the amount of depression of the brake pedal 12. For example, the manipulation-amount detection means may have an arrangement which converts the hydraulic pressure detected by the pressure sensor Pm, into the amount of depression of the brake pedal 12, or an arrangement which detects the amount of depression of the brake pedal 12 by a tread-force sensor (not shown).

The hydraulic brake pressure in the first and second hydraulic chambers 98b and 98a in the electric brake device 16 is transmitted to the wheel cylinders 32FR, 32RL, 32RR, and 32FL in the disc brake mechanisms 30a to 30d through the first and second in-valves 120 and 124 in the VSA apparatus 18, which are in the valve-open state, so that the wheel cylinders 32FR, 32RL, 32RR, and 32FL are actuated and desired braking force is exerted on the respective wheels.

In other words, during normal operation of the vehicle brake system 10 according to the present embodiment in which the electric brake device 16 (which functions as a hydraulic power source), the control means (which performs the brake-by-wire control), and other functions of the vehicle brake system 10 can operate, the aforementioned brake-by-wire system becomes active. In the brake-by-wire system, when the operator depresses the brake pedal 12, the first and second shutoff valves 60a and 60b shut off the communication between the disc brake mechanisms 30a to 30d and the master cylinder 34 (which generates hydraulic pressure), and the disc brake mechanisms 30a to 30d (which have the wheel cylinders 32FR, 32RL, 32RR, and 32FL and brake the respective wheels) are activated by the hydraulic brake pressure generated by the electric brake device 16. Therefore, the present embodiment can be preferably applied to the vehicles (e.g., electric vehicles) in which the negative pressure produced by the internal combustion engine does not exist (although such negative pressure has been conventionally used).

On the other hand, under abnormal conditions in which the electric brake device 16 or the like cannot operate, the first and second shutoff valves 60a and 60b are opened and the third shutoff valve 62 is closed, so that the hydraulic brake pressure generated in the master cylinder 34 is transmitted to (the wheel cylinders 32FR, 32RL, 32RR, and 32FL in) the disc brake mechanisms 30a to 30d, and the disc brake mechanisms 30a to 30d are activated by the hydraulic brake pressure transmitted from the master cylinder 34. That is, the so-called traditional hydraulic brake system operates.

For example, the hybrid vehicles and the electric vehicles having one or more electric drive motors can be provided with a regenerative brake which generates braking force by regenerative power generation by the electric drive motor. In the case where the regenerative brake is used in such vehicles, the control means (not shown) causes one or more motors coupled to at least one of the front and rear shafts to operate as an electric generator and generate regenerative braking force corresponding to the amount of depression of the brake pedal 12 or the like. When the regenerative braking force is insufficient for the amount of depression of the brake pedal 12 (i.e., the braking force required by the operator), the control means drives the electric motor 72 and causes the electric brake device 16 to generate braking force. Thus, the control means performs cooperative control of the regenerative brake and the hydraulic brake (which is realized by the electric brake device 16). The control means can be configured to determine the amount of operation in the electric brake device 16 in a known manner. For example, the control means can be configured to determine the amount of operation in the electric brake device 16 by setting as the target hydraulic pressure a hydraulic brake pressure for causing the electric brake device 16 to generate the braking force equal to the difference between the regenerative braking force and the (total) braking force determined in correspondence with the amount of depression of the brake pedal 12, or setting as the target hydraulic pressure a hydraulic brake pressure for causing the electric brake device 16 to generate the braking force at a predetermined ratio to the total braking force.

Figure 2:
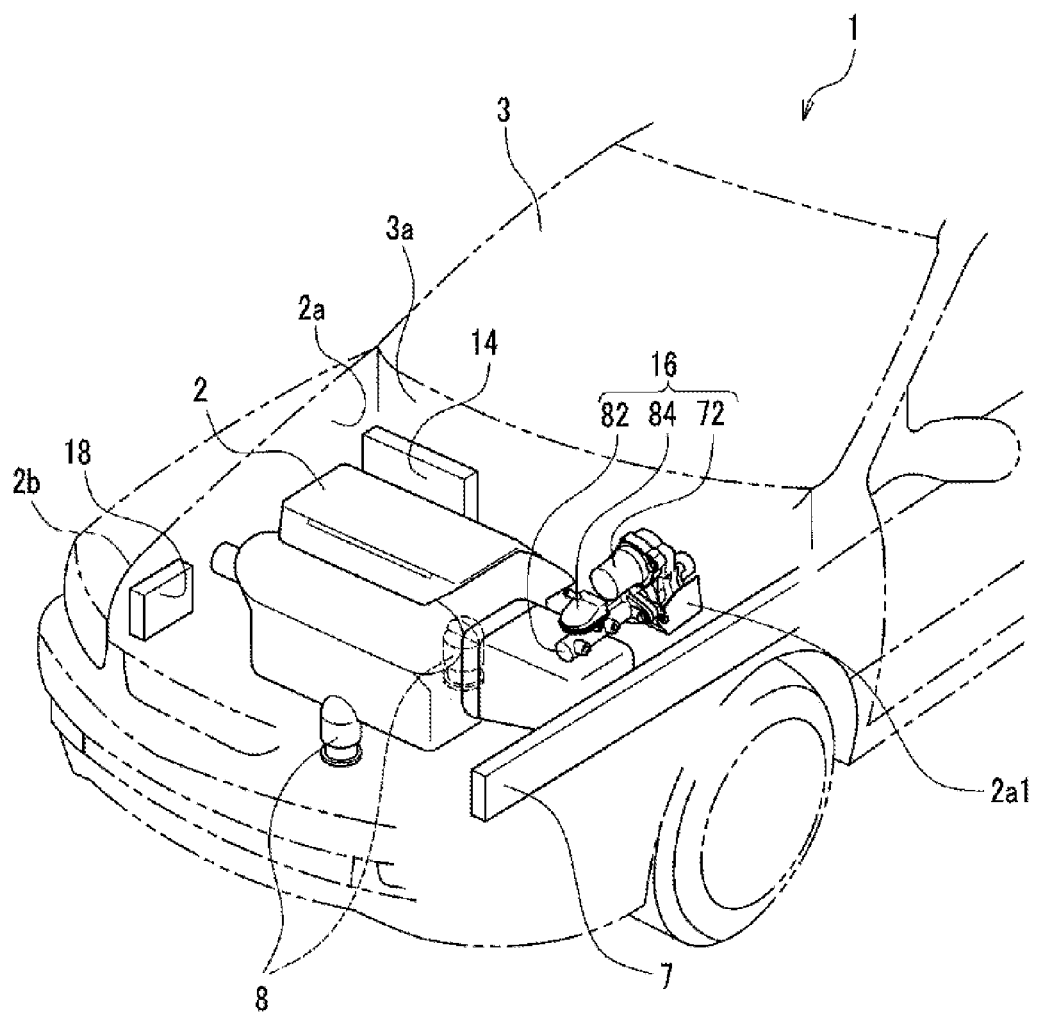
FIG. 2 is a perspective diagram illustrating an arrangement in which the electric brake device is disposed in a power-plant containment room.

In the case where the vehicle brake system 10 arranged as above is installed in the vehicle, for example, as illustrated in FIG. 2, the input apparatus 14, the electric brake device 16, and the VSA apparatus 18 are separately formed and attached to the containment room (the power-plant containment room 2a) containing a power plant 2 of the vehicle 1, so as to be dispersedly arranged as appropriate. The power plant 2 is a vehicle power unit which generates power for driving the vehicle 1, and is, for example, an internal combustion engine, one or more electric motors installed in an electric vehicle for driving the electric vehicle, an integral unit of an internal combustion engine and one or more electric motors installed in a hybrid vehicle.

The power-plant containment room 2a is formed in a front portion of the vehicle 1 by partitioning off with a dashboard 3a from the room for the operator and one or more occupants (i.e., the cabin 3). The power plant 2, the vehicle brake system 10 (including the input apparatus 14, the electric brake device 16, and the VSA apparatus 18), and auxiliary parts (not shown) are installed in the power-plant containment room 2a. In addition, a containment-room cover 2b is arranged at an upper portion of the power-plant containment room 2a in such a manner that the containment-room cover 2b can be opened and closed. Further, front-side members 7 which are to extend in the front-back direction on the right and left sides of the vehicle 1 are arranged on the right and left sides of the power-plant containment room 2a.

The front, back, up, down, right, and left directions are directions with respect to the vehicle 1. For example, the up and down directions (vehicle up and down directions) are vertical directions of the vehicle 1 when the vehicle 1 is in a horizontal position, and the right and left directions are right and left directions in forward view of the vehicle 1.

The power plant 2 is arranged in the power-plant containment room 2a between the front-side members 7 on the right and left sides, and supported by vibration-reduction supporting devices 8, which are fixed to a subframe (not shown). In addition, spaces are formed between the power plant 2 and the front-side members 7 on the right and left sides. Further, a space is formed on the upper side of the power plant 2 between the containment-room cover 2b and the power plant 2.

Therefore, according to the present embodiment, the input unit 14, the electric brake device 16, and the VSA apparatus 18 are installed in the power-plant containment room 2a, and, for example, the electric brake device 16 is installed in such a manner that a portion of the cylinder body 82 is located in the space formed between the power plant 2 and the containment-room cover 2b.

In addition, in the present embodiment, the state in which the electric motor 72 is arranged above the cylinder body 82 means the state in which the electric motor 72 is arranged in such a manner that the axis of the output shaft 72b which is arranged approximately parallel to the axial direction of the second and first slave pistons 88a and 88b (the hydraulic control pistons) illustrated in FIG. 1 is located above the axes of the second and first slave pistons 88a and 88b in the vertical direction of the vehicle with respect to the right-left direction of the vehicle 1 (illustrated in FIG. 2).

The electric brake device 16 according to the present embodiment is constructed in such a manner that the cylinder body 82 and the actuator housing 172, which houses the gear mechanism 78 and the ball-screw structure 80 (which are illustrated in FIG. 1), can be separated at a separation plane approximately perpendicular to the axis of the cylinder body 82. The electric brake device 16 is constructed by coupling the cylinder body 82 to the actuator housing 172 and further attaching the electric motor 72 to the actuator housing 172.

The cylinder body 82 is connected to the front side of the actuator housing 172. Specifically, an opening 172a, through which the ball-screw shaft 80a protrudes forward, is opened to the front side of the actuator housing 172, and the cylinder body 82 is connected to the front side of the actuator housing 172 in such a manner that a hollow portion (not shown) in which the first and second slave pistons 88b and 88a (illustrated in FIG. 1) slide communicates with the opening 172a.

For example, a flange 175 extending in the right and left directions is formed around the opening 172a in the actuator housing 172, and, for example, two screw holes 176 are opened in the flange 175. On the other hand, a flange 820 extending in the right and left directions is formed at the end of the cylinder body 82 on the actuator housing 172 side, and cylinder-attachment holes 821 are opened at the positions of the flange 820 corresponding to the screw holes 176 in the actuator housing 172. In addition, a fitting portion 820a to be fitted into the opening 172a in the actuator housing 172 is formed by extending rearward (toward the actuator housing 172 side) a peripheral portion of the hollow portion (not shown) in the cylinder body 82. Further, the cylinder body 82 and the actuator housing 172 are positioned such that the flange 820 in the cylinder body 82 faces the flange 175 in the actuator housing 172, and fastening members 822 such as bolts are screwed from the cylinder body 82 side through the cylinder body 82 into the screw holes 176, so that the cylinder body 82 is fastened to the actuator housing 172.

At this time, it is preferable that the fitting portion 820a in the cylinder body 82 be fitted into the opening 172a in the actuator housing 172 through an O-ring 820b having a sealing function so as to realize a liquid-tight connection of the cylinder body 82 and the actuator housing 172. In the case where the fitting portion 820a is fitted as above, it is possible to prevent external leakage of the brake fluid with which the cylinder body 82 is filled, from the connection of the cylinder body 82 and the actuator housing 172.

As described above, the cylinder body 82 is connected to the front side of the actuator housing 172, and the ball-screw shaft 80a comes into contact with the second slave piston 88a.

In addition, the electric motor 72 is attached to the actuator housing 172 in a position above the cylinder body 82 in such a manner that the axial direction of the output shaft 72b (illustrated in FIG. 1) is approximately parallel to the axial direction of the first and second slave pistons 88*b* and 88*a* (illustrated in FIG. 1), i.e., parallel to the axial direction of the cylinder body 82.

For example, the second gear 78*b* (illustrated in FIG. 1) is placed above the third gear 78*c* (illustrated in FIG. 1) and the actuator housing 172 is extended upward so as to enclose the second and third gears 78*b* and 78*c*. In addition, the actuator housing 172 includes a first gear room 172*b* which encloses the first gear 78*a* such that the first gear 78*a* can be engaged with the second gear 78*b*. The first gear room 172*b* is opened to the front side, and arranged above the second gear 78*b*. Further, the electric motor 72 is attached to the front side of the actuator housing 172 in such a manner that the first gear 78*a* (illustrated in FIG. 1), which is attached to the output shaft 72*b* (illustrated in FIG. 1), is enclosed in the first gear room 172*b* and engaged with the second gear 78*b*.

Figure 4:
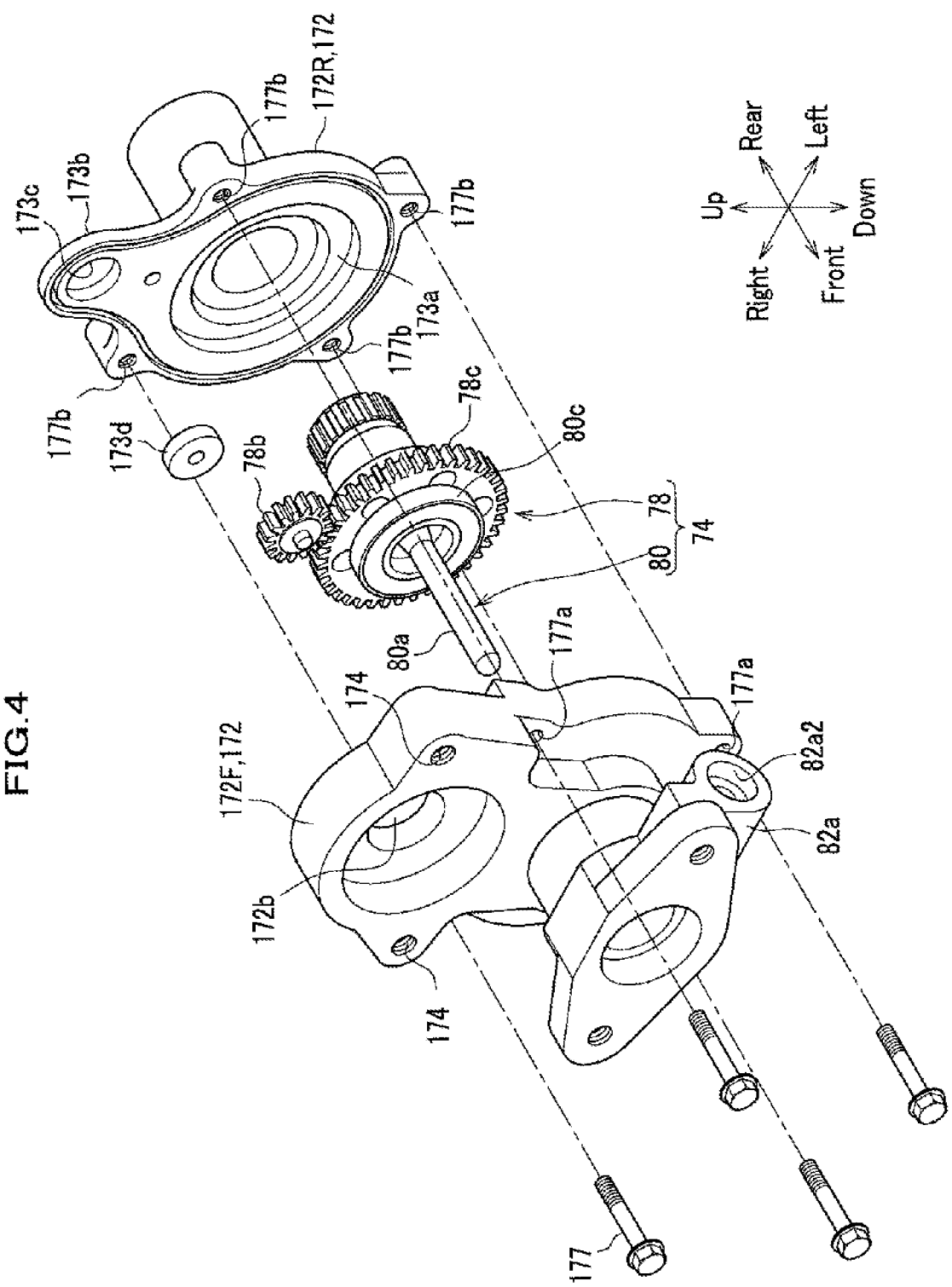
FIG. 4 is an exploded perspective view of an actuator housing.

As illustrated in FIG. 4, the actuator housing 172 according to the present embodiment, which is constituted by a housing body 172F and a housing cover 172R, is constructed in such a manner that the housing body 172F and the housing cover 172R can be separated. Multiple through-holes 177*a*, through which bolts 177 are to be inserted, are formed in the housing body 172F so as to be located around the center axis of the first and second slave pistons 88*b* and 88*a* (illustrated in FIG. 1), and multiple attachment screw holes 177*b* are formed in the positions of the housing cover 172R corresponding to the through-holes 177*a*. The housing body 172F and the housing cover 172R are coupled by inserting the bolts 177 through the through-holes 177*a* and screwing the bolts 177 into the attachment screw holes 177*b*.

A space having an approximately cylindrical shape, centering at the center axis of the ball-screw shaft 80*a*, and opening to the front side is formed in the housing cover 172R to realize a mechanism-enclosing portion 173*a*. In addition, the front side of the housing cover 172R is extended upward to form a backside portion 173*b*. The backside portion 173*b* constitutes the backside of the first gear room 172*b*, which is formed in the housing body 172F for enclosing the first gear 78*a* (illustrated in FIG. 1) attached to the electric motor 72. A space (realizing a bearing portion 173*c*) opening forward and containing a bearing member 173*d*, which rotatably supports the output shaft 72*b*, is formed at a position on the axis of the output shaft 72*b* of the electric motor 72 (illustrated in FIG. 1).

The housing body 172F and the housing cover 172R are mated in the front-back direction and connected with the bolts 177 as described before in such a manner that the third gear 78*c* and the ball-screw structure 80 are enclosed in the mechanism-enclosing portion 173*a* and the bearing member 173*d* is enclosed in the bearing portion 173*c*. Thus, the actuator housing 172 is constructed.

The second gear 78*b* is formed such that the second gear 78*b* can be rotatably enclosed in an enclosing portion (not shown) which is formed in the housing body 172F, and the backside portion 173*b* becomes a back surface of the enclosing portion of the second gear 78*b*. In addition, the reference 80*c* denotes a bearing member (e.g., a ball bearing) rotatably supports the third gear 78*c* in the mechanism-enclosing portion 173*a*, and the mechanism-enclosing portion 173*a* is formed to enclose the third gear 78*c* through the bearing member 80*c*.

Figure 3:
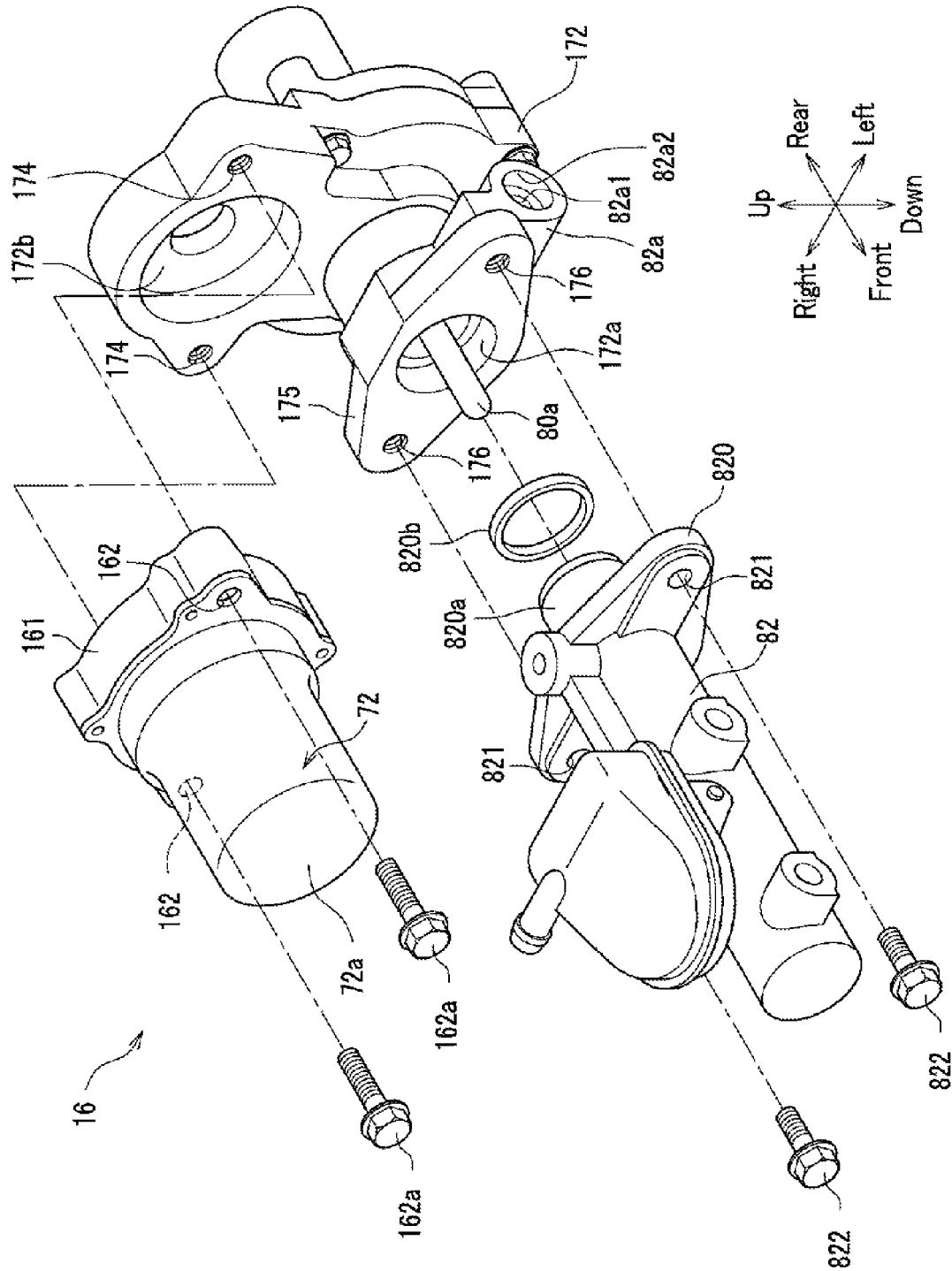
FIG. 3 is an exploded perspective view of the electric brake device.

FIG. 3 is referred to again. The structure for attaching the electric motor 72 to the actuator housing 172 is not specifically limited. For example, as illustrated in FIG. 3, in the motor casing 72*a*, edge portions of the motor casing 72*a* on the actuator housing 172 side extend to the peripheral directions to form a flange 161, and motor-attachment holes 162, through which fastening members such as bolts are to be inserted, are opened in the flange 161. In addition, screw holes 174 are opened at the positions of the actuator housing 172 corresponding to the motor-attachment holes 162. The electric motor 72 is attached to the front side (the same side as the side to which the cylinder body 82 is connected) of the actuator housing 172 in such a manner that the output shaft 72*b* (illustrated in FIG. 1) to which the first gear 78*a* (illustrated in FIG. 1) is attached is approximately parallel to the axial direction of the cylinder body 82, and the first gear 78*a* is enclosed in the first gear room 172*b* and engaged with the second gear 78*b* (illustrated in FIG. 1). At this time, an end of the output shaft 72*b* of the electric motor 72 is rotatably supported by the bearing member 173*d* (illustrated in FIG. 4). In addition, fastening members 162*a* are screwed from the electric motor 72 side into the screw holes 174 through the motor-attachment holes 162, so that the motor casing 72*a* is fastened to the actuator housing 172.

In the above construction, the cylinder body 82 and the electric motor 72 are arranged on the same side of the actuator housing 172. That is, in the electric brake device 16 according to the present embodiment, the cylinder body 82 is connected to the actuator housing 172, and the electric motor 72 is attached to the actuator housing 172 such that the electric motor 72 is located above the cylinder body 82.

Figure 5:
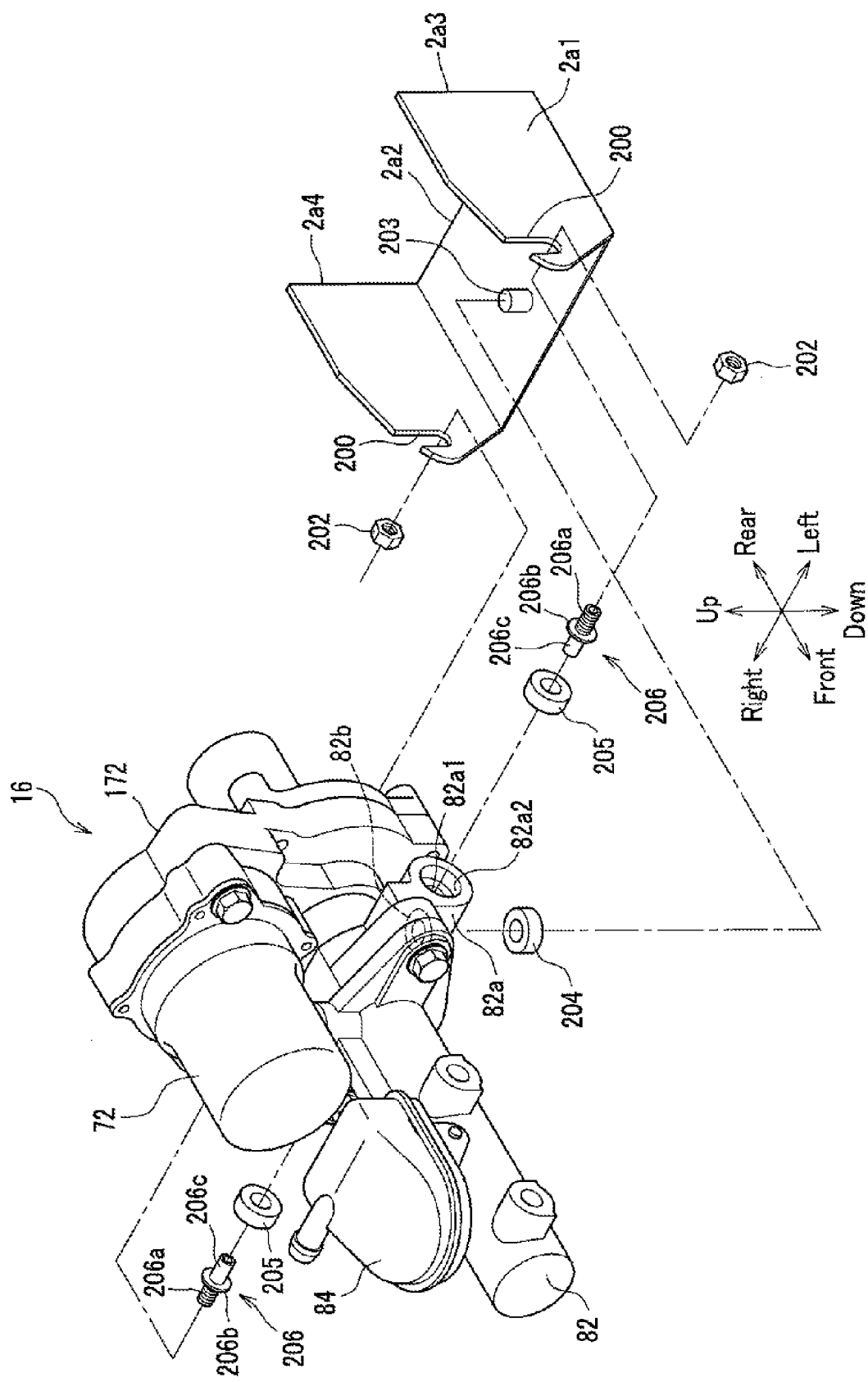
FIG. 5 is a diagram illustrating an example of a structure in which the electric brake device is attached to a bracket.

In addition, a mount portion for attaching the electric brake device 16 to the vehicle 1 (illustrated in FIG. 2) through a bracket 2*a*1 (illustrated in FIG. 2) is arranged in the actuator housing 172. The bracket 2*a*1 has approximately a U-shape which opens upward in front view as illustrated in FIG. 5, and is formed to hold the actuator housing 172 of the electric brake device 16 in the bracket 2*a*1 from the right and left sides. Further, as illustrated in FIGS. 4 and 5, the mount portion is realized by forming in the actuator housing 172 fastening bosses 82*a* which are arranged for the bracket 2*a*1 to hold the actuator housing 172. The fastening bosses are formed below the ball-screw shaft 80*a* to protrude to the right and left directions.

Furthermore, a through-hole is formed through the fastening bosses 82*a*, which protrude to the right and left directions. The through-hole realizes insertion holes into which attachment fastening members (bolt members 206) are inserted, and is referred to as the attachment hole 82*a*1. The actuator housing 172 in the electric brake device 16 is fixed to the bracket 2*a*1 with the attachment fastening members as explained later. Moreover, the diameters of both ends of the attachment hole 82*a*1 are increased to form diameter-increased portions 82*a*2. The electric brake device 16 being constructed as above and having the mount portion is attached, for example, to the dashboard 3*a* of the power-plant containment room 2*a* through the bracket 2*a*1 as illustrated in FIG. 2. The structure for fixing the electric brake device 16 in the power-plant containment room 2*a* is not limited, and the electric brake device 16 may be fixed to a subframe (not shown) or the like.

As illustrated in FIG. 5, the bracket 2*a*1 has a structure in which a left wall portion 2*a*3 and a right wall portion 2*a*4 are erected from the right and left edges of a bottom portion 2*a*2. The bracket 2*a*1 is formed such that the fastening bosses 82*a* formed in the actuator housing 172 are held by the left wall portion 2*a*3 and the right wall portion 2*a*4 from the left and right sides. For example, upward opening notches 200 are formed in the left wall portion 2*a*3 and the right wall portion 2*a*4 at the positions corresponding to the attachment hole 82*a*1 in the electric brake device 16 in such a manner that the notch 200 in the left wall portion 2*a*3, the attachment hole 82*a*1, and the notch 200 in the right wall portion 2*a*4 align on a straight line when the fastening bosses 82a are held by the left wall portion 2a3 and the right wall portion 2a4.

In addition, mount rubbers 205, which have an annular shape and a function of a buffer member, are fitted into the diameter-increased portions 82a2, and the bolt members 206 are inserted into the central portions of the mount rubbers 205. For example, in each of the bolt members 206 according to the present embodiment, a screw portion 206a and a shaft portion 206c, which is inserted into the central portion of one of the mount rubber 205, are formed along a straight line, and a flange 206b extending to the periphery is formed between the shaft portion 206c and the screw portion 206a.

Further, as illustrated in FIG. 5, the shaft portion 206c of each bolt member 206 is inserted into the central portion of one of the mount rubbers 205, which is fitted into one of the diameter-increased portions 82a2 of the attachment holes 82a1 in such a manner that each flange 206b is located between one of the mount rubbers 205 and one of the left and right wall portions 2a3 and 2a4, and nuts 202 are fastened onto the screw portions 206a which externally protrude from the notches 200 of the bracket 2a1. According to the above arrangement, the electric brake device 16 is attached to the bracket 2a1 by the insertion of the shaft portions 206c of the bolt members 206 into the central portions of the mount rubbers 205, where the bolt members 206 are fixed to the left and right wall portions 2a3 and 2a4 with the nuts 202, and the mount rubbers 205 are fitted into the attachment holes 82a1.

In addition, the reference 203 denotes a protrusion for positioning the electric brake device 16 and is arranged to engage with an engagement hole 82b through an annular mount rubber 204, where the engagement hole 82b is formed on the bottom side of the actuator housing 172 as a buffering member. Specifically, the protrusion 203 is fitted into a through-hole at the center of the mount rubber 204, and the protrusion 203 and the mount rubber 204 are engaged with the engagement hole 82b.

When the bracket 2a1 arranged as above is fixed to, for example, the dashboard 3a (illustrated in FIG. 2) of the power-plant containment room 2a (illustrated in FIG. 2), the electric brake device 16 is disposed in the power-plant containment room 2a. The attachment holes 82a1 are not limited to the type realized by the through-hole formed through the fastening bosses 82a. For example, bottomed holes, instead of the attachment holes 82a1, may be formed at the right and left ends of the fastening bosses 82a which are formed in the right and left sides.

In the electric brake device 16 (illustrated in FIG. 5) which is constructed and disposed in the power-plant containment room 2a (illustrated in FIG. 2) as described above, the inside of the cylinder body 82 (illustrated in FIG. 1) is filled with the brake fluid, and the brake fluid is sealed within the inside of the cylinder body 82 with the slave cup seals 90a and 90b (illustrated in FIG. 1) and the guide piston 90c (illustrated in FIG. 1) as explained before.

Further, the second slave piston 88a (illustrated in FIG. 1) and the first slave piston 88b (illustrated in FIG. 1) move along the axis of the cylinder body 82 and generate predetermined hydraulic pressure according to the brake manipulation force inputted into the input apparatus 14 (illustrated in FIG. 1). At this time, the ball-screw shaft 80a moves forward for moving forward the first and second slave pistons 88b and 88a, and a portion of the ball-screw shaft 80a enclosed in the mechanism-enclosing portion 173a is pushed out of the mechanism-enclosing portion 173a, so that the volume inside the mechanism-enclosing portion 173a increases and the pressure inside the mechanism-enclosing portion 173a decreases.

The seals arranged around the guide piston 90c are formed to deliver preferable sealing performance when the pressures on the first and second slave pistons 88b and 88a side rise. Therefore, when the portion of the ball-screw shaft 80a returns to the mechanism-enclosing portion 173a and therefore the volume inside the mechanism-enclosing portion 173a decreases and the pressure inside the mechanism-enclosing portion 173a increases, in some cases, the sealing performance of the guide piston 90c is lowered and seal imperfection occurs in the guide piston 90c.

Therefore, an intake/exhaust mechanism is provided in the electric brake device 16 (illustrated in FIG. 3) according to the present embodiment. When the pressure of the mechanism-enclosing portion 173a decreases, for example, when the ball-screw shaft 80a moves forward, the intake/exhaust mechanism takes in external air so as to maintain the mechanism-enclosing portion 173a at the atmospheric pressure. When the pressure of the mechanism-enclosing portion 173a increases, for example, when the ball-screw shaft 80a moves backward, the intake/exhaust mechanism exhausts the air from the mechanism-enclosing portion 173a so as to suppress the pressure in the mechanism-enclosing portion 173a and maintain the mechanism-enclosing portion 173a at the atmospheric pressure.

Figure 6:
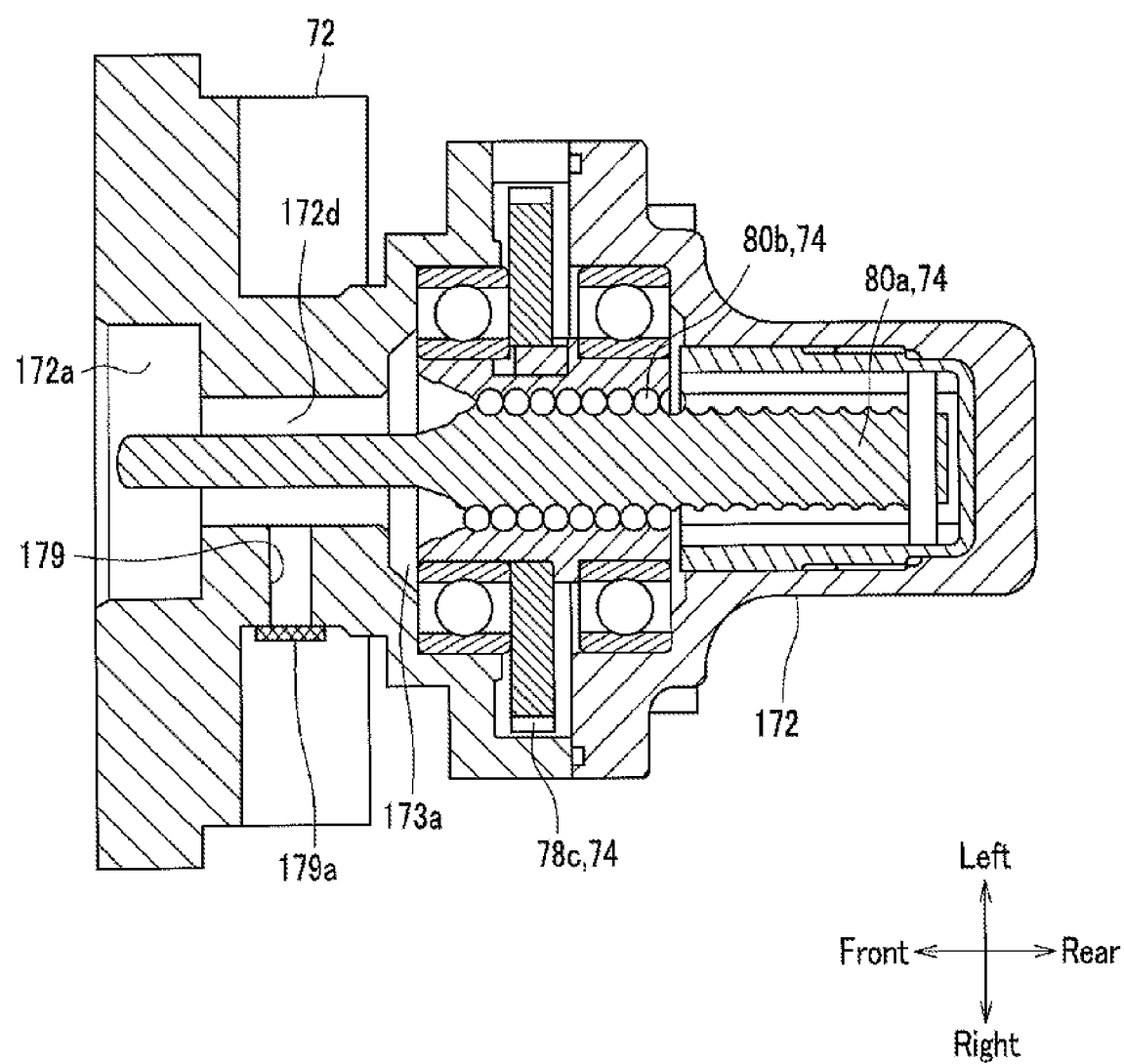
FIG. 6 is a cross-sectional view of the actuator housing from the lower side.

For example, as illustrated in FIG. 6, a communication hole (intake/exhaust hole 179) which communicates with the outside of the actuator housing 172 is formed in a passage portion 172d of the actuator housing 172 in the direction perpendicular to the axis of the ball-screw shaft 80a in order to realize the intake/exhaust mechanism. The passage portion 172d is formed in the actuator housing 172 for allowing forward and backward movement of the tip portion of the ball-screw shaft 80a. Since the passage portion 172d is formed to communicate with the mechanism-enclosing portion 173a, the intake/exhaust hole 179 formed in the passage portion 172d can form a structure realizing communication between the mechanism-enclosing portion 173a and the outside of the actuator housing 172. That is, the intake/exhaust hole 179 can realize communication between the mechanism-enclosing portion 173a and the atmosphere.

According to the above arrangement, when the pressure inside the mechanism-enclosing portion 173a decreases, for example, by forward movement of the ball-screw shaft 80a, the external air is taken into the mechanism-enclosing portion 173a through the intake/exhaust hole 179, so that the inside of the mechanism-enclosing portion 173a is maintained at the atmospheric pressure. Therefore, it is possible to avoid pressure reduction of the inside of the mechanism-enclosing portion 173a and prevent seal imperfection in the guide piston 90c (illustrated in FIG. 1).

In addition, it is preferable that the intake/exhaust hole 179 is formed rightward, leftward, or downward (not shown) from the passage portion 172d as illustrated in FIG. 6. According to this arrangement, it is possible to prevent intrusion, from the intake/exhaust hole 179 into the mechanism-enclosing portion 173a, of condensed water such as rain which falls from upside of the electric brake device 16.

Further, it is preferable that the intake/exhaust hole 179 be provided with a water-proof moisture-permeable film 179a being formed of a material with a water proofing property and a moisture permeability property and covering an opening of the intake/exhaust hole 179. This provision can preferably prevent flow of condensed water in the intake/exhaust hole 179, and can prevent intrusion of condensed water such as rain water from the intake/exhaust hole 179 into the mechanism-enclosing portion 173a with high reliability. It is preferable that the water-proof moisture-permeable film 179a be a gas-permeable film which allows permeation of air (including water vapor) and does not allow permeation of condensed water. For example, the water-proof moisture-permeable film 179a is preferably a film of Gore-Tex (which is a registered trademark). For example, the water-proof moisture-permeable film 179a can be attached by adhesion or the like so as to cover the opening on the outer side of the intake/exhaust hole 179.

The intake/exhaust mechanism according to the present embodiment is not limited to the intake/exhaust hole 179, which realizes communication between the passage portion 172d and the outside of the electric brake device 16. For example, the intake/exhaust mechanism may be realized by providing as an intake/exhaust hole 181a communication hole which realizes communication between the mechanism-enclosing portion 173a and the attachment hole 82a1 (which is formed in the actuator housing 172). In this case, the mechanism-enclosing portion 173a communicates with the atmosphere (the outside of the electric brake device 16) through the attachment hole 82a1 and the intake/exhaust hole 181. Further, attachment of water-proof moisture-permeable films 181a to the intake/exhaust hole 181 can be easily realized by fixing the water-proof moisture-permeable films 181a with the mount rubbers 205, which are fitted into the diameter-increased portions 82a2 of the attachment holes 82a1 as illustrated in FIG. 8A when the electric brake device 16 is attached to the bracket 2a1 (illustrated in FIG. 5).

Figure 7:
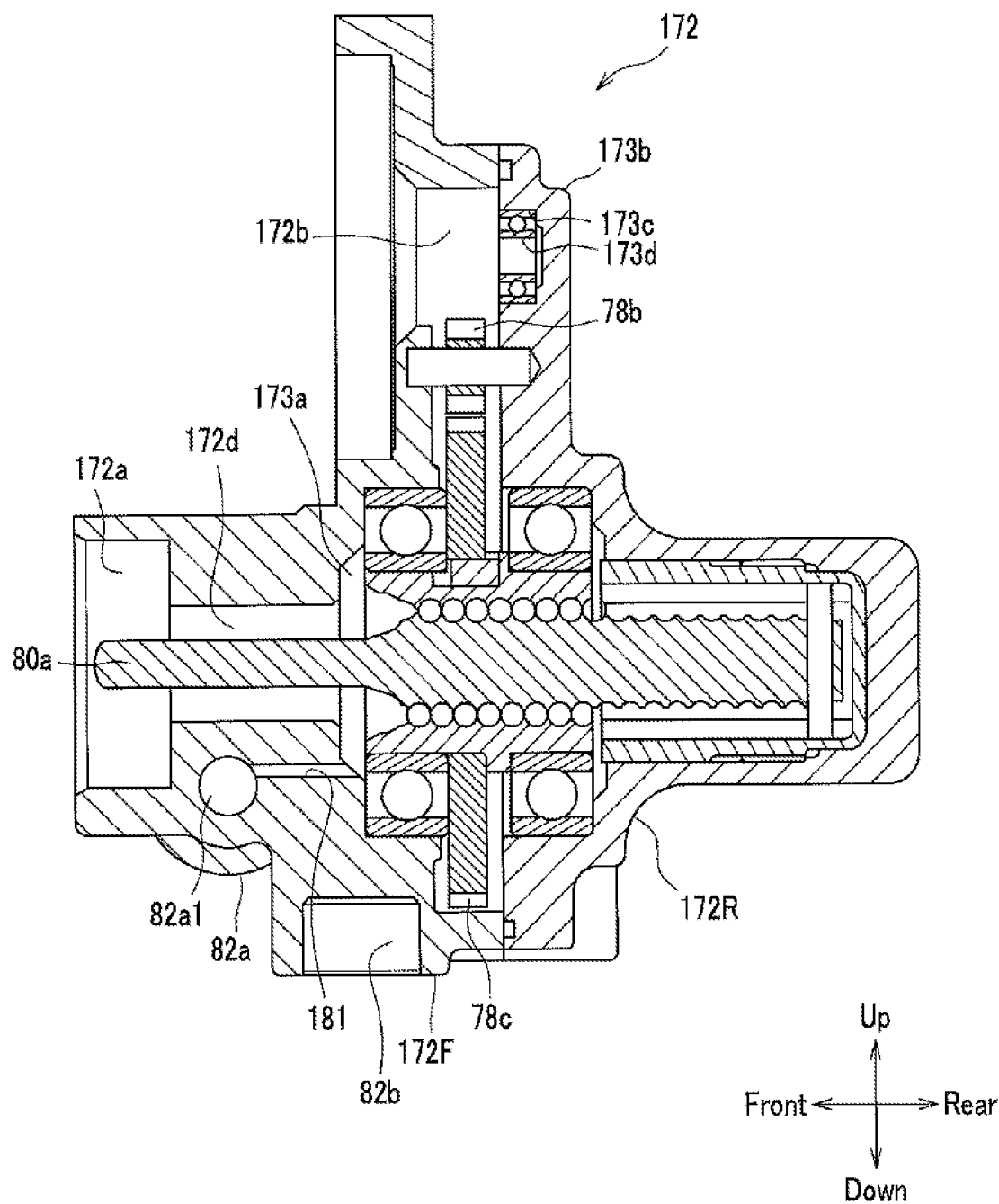
FIG. 7 is a cross-sectional view of an intake/exhaust hole which realizes communication between an insertion hole and a mechanism-enclosing portion.
Figure 8A:
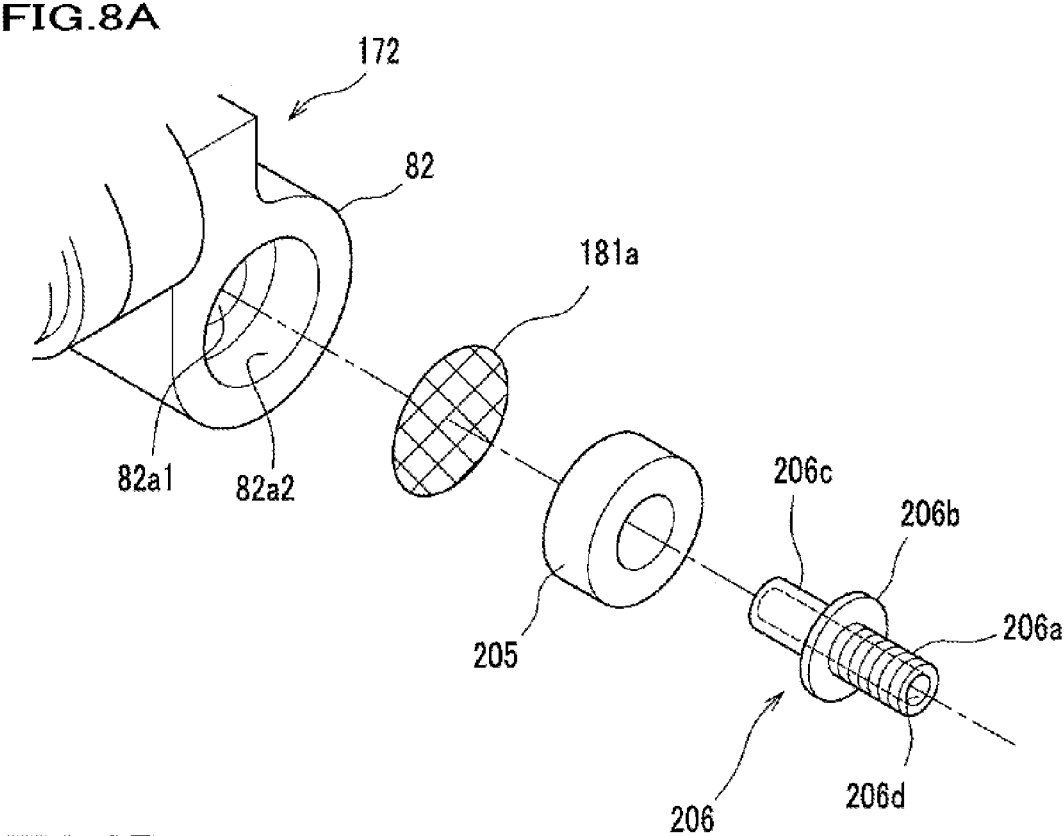
FIG. 8A is a diagram illustrating a manner of fixing a water-proof moisture-permeable film with a mount rubber.

Specifically, when the electric brake device 16 (illustrated in FIG. 5) is attached to the bracket 2a1 (illustrated in FIG. 1), the water-proof moisture-permeable films 181a are fitted into the diameter-increased portions 82a2 so as to cover the attachment holes 82a1, and the mount rubbers 205 are fitted into the diameter-increased portions 82a2 so as to hold the water-proof moisture-permeable films 181a, as illustrated in FIG. 8A. In addition, for example, in the case where a through-hole 206d is formed in each of the bolt members 206 through approximately the centers of the shaft portion 206c and the screw portion 206a, the mechanism-enclosing portion 173a (illustrated in FIG. 7) can be constructed such that the mechanism-enclosing portion 173a communicates with the atmosphere through the intake/exhaust hole 181, the attachment holes 82a1, and the through-holes 206d in the bolt members 206 even in the state in which the electric brake device 16 is attached the bracket 2a1. Further, the water-proof moisture-permeable films 181a can prevent intrusion of condensed water such as rain water into the mechanism-enclosing portion 173a. Furthermore, in order to prevent interference of the bolt members 206 with the water-proof moisture-permeable films 181a in the above construction, it is preferable that the length of the shaft portion 206c be smaller than the thickness of each of the mount rubbers 205.

Figure 8B:
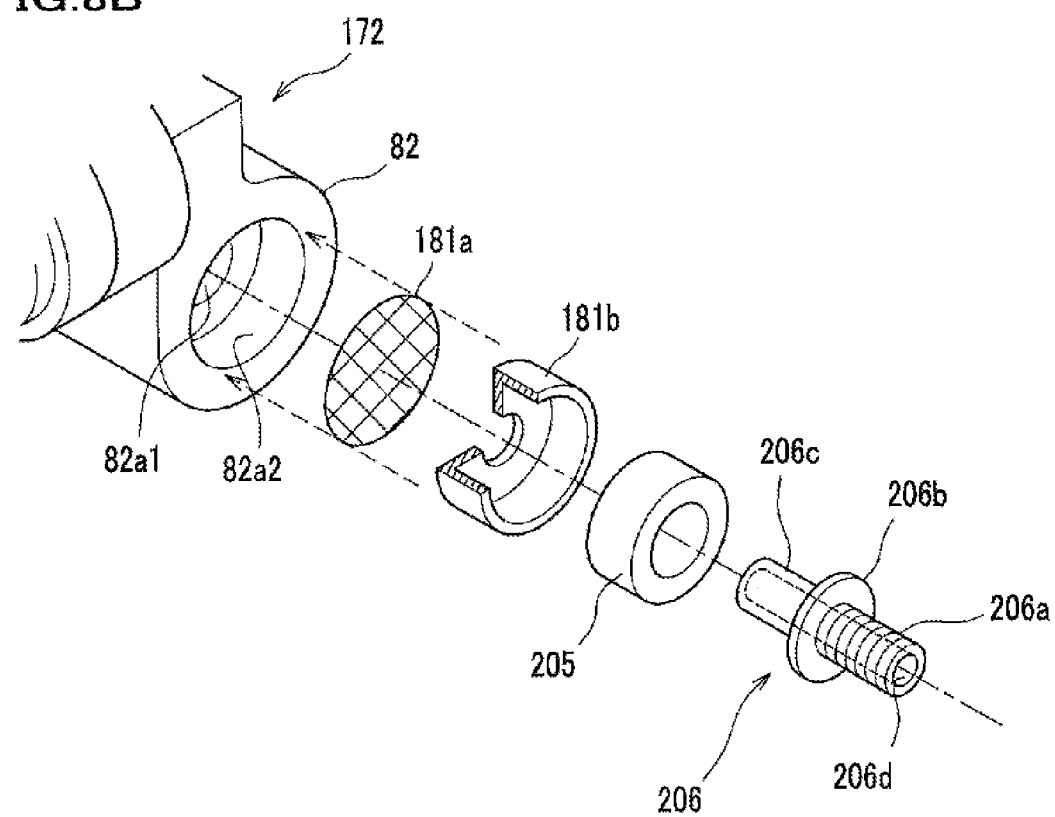
FIG. 8B is a diagram in which a holding member for fixing the water-proof moisture-permeable film is illustrated by a partial cross-sectional view.

In addition, as illustrated in FIG. 8B, each of the water-proof moisture-permeable films 181a may be supported (fixed) by a holding member 181b. For example, the structure as illustrated in FIG. 8B may be used. That is, each holding member 181b may have a cuplike shape having a bottom, where approximately the central portion of the bottom opens. In addition, the holding members 181b, by which the water-proof moisture-permeable films 181a are fixed, are press fitted into the diameter-increased portions 82a2. Further, the mount rubbers 205 are inserted inside the holding members 181b. According to the above construction, since the water-proof moisture-permeable films 181a are fixed by the holding members 181b, it is possible to prevent intrusion of condensed water such as rain water into the attachment hole 82a1, with high reliability. However, each holding member 181b is not limited to the cuplike bottomed member. For example, each holding member 181b may have an approximately cylindrical shape without a bottom. Further, a cut may be formed in the approximately cylindrical shape and have an approximately C-shape in front view.

Figure 9:
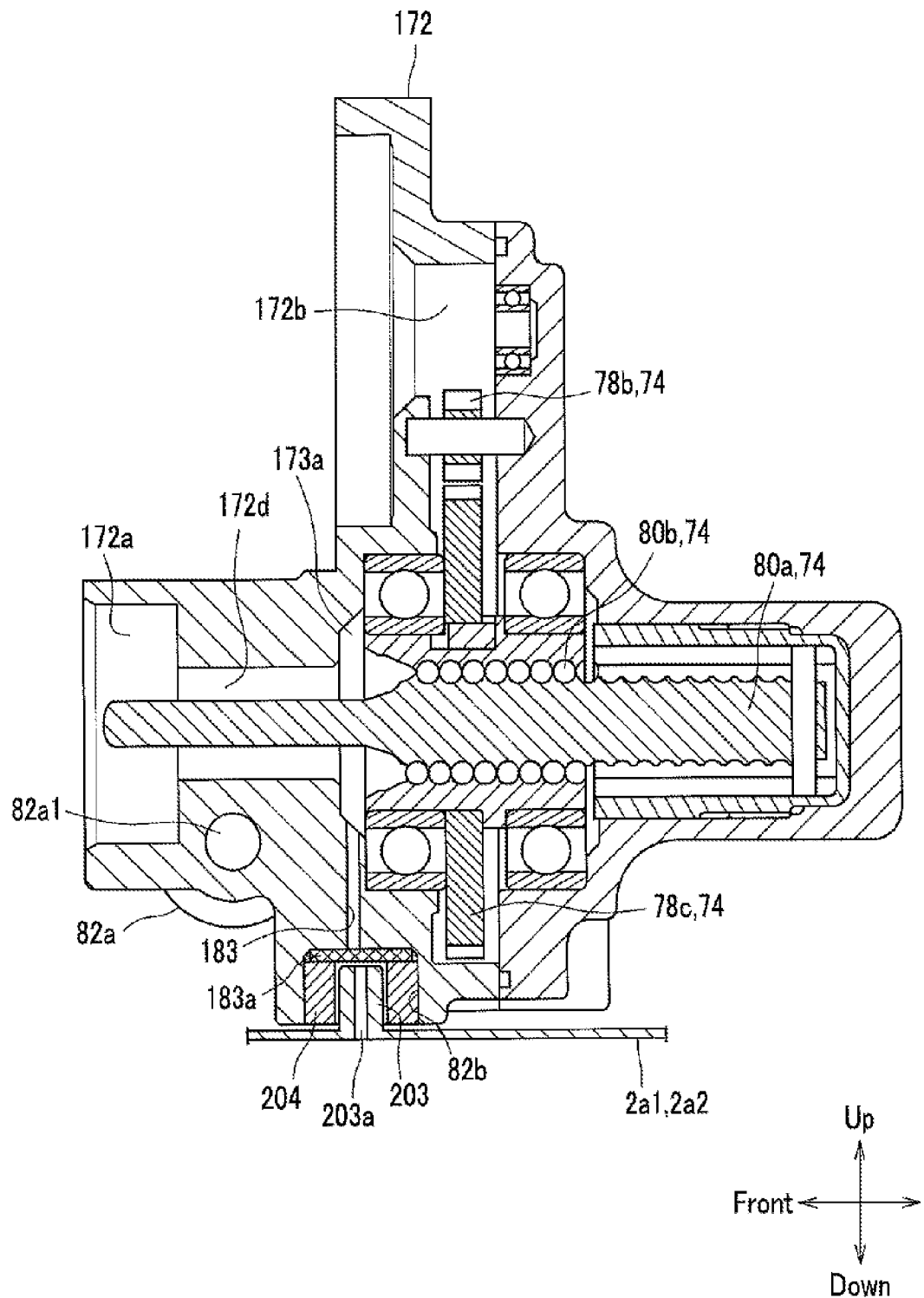
FIG. 9 is a cross-sectional view of an intake/exhaust hole which realizes communication between an engagement hole and the mechanism-enclosing portion.

Alternatively, as illustrated in FIG. 9, the intake/exhaust mechanism may include as an intake/exhaust hole 183 a communication hole which realizes communication between the mechanism-enclosing portion 173a and the engagement hole 82b in the actuator housing 172, where the protrusion 203 formed in the bottom portion 2a2 of the bracket 2a1 is fitted into the engagement hole 82b. In this case, the mechanism-enclosing portion 173a communicates with the atmosphere (the outside of the electric brake device 16) through the engagement hole 82b and the intake/exhaust hole 183. In addition, a water-proof moisture-permeable film 183a can be easily attached to the intake/exhaust hole 183 by forming a structure in which the water-proof moisture-permeable film 183a is fixed with the mount rubber 204, which is fitted into the engagement hole 82b when the electric brake device 16 is attached to the bracket 2a1.

Further, in the case where a through-hole 203a is formed in the central portion of the protrusion 203 of the bracket 2a1, the mechanism-enclosing portion 173a communicates with the atmosphere through the intake/exhaust hole 183, the engagement hole 82b, and the through-hole 203a in the protrusion 203, and the water-proof moisture-permeable film 183a prevents intrusion of condensed water such as rain water into the mechanism-enclosing portion 173a, even in the state in which the electric brake device 16 is attached to the bracket 2a1.

Figure 10:
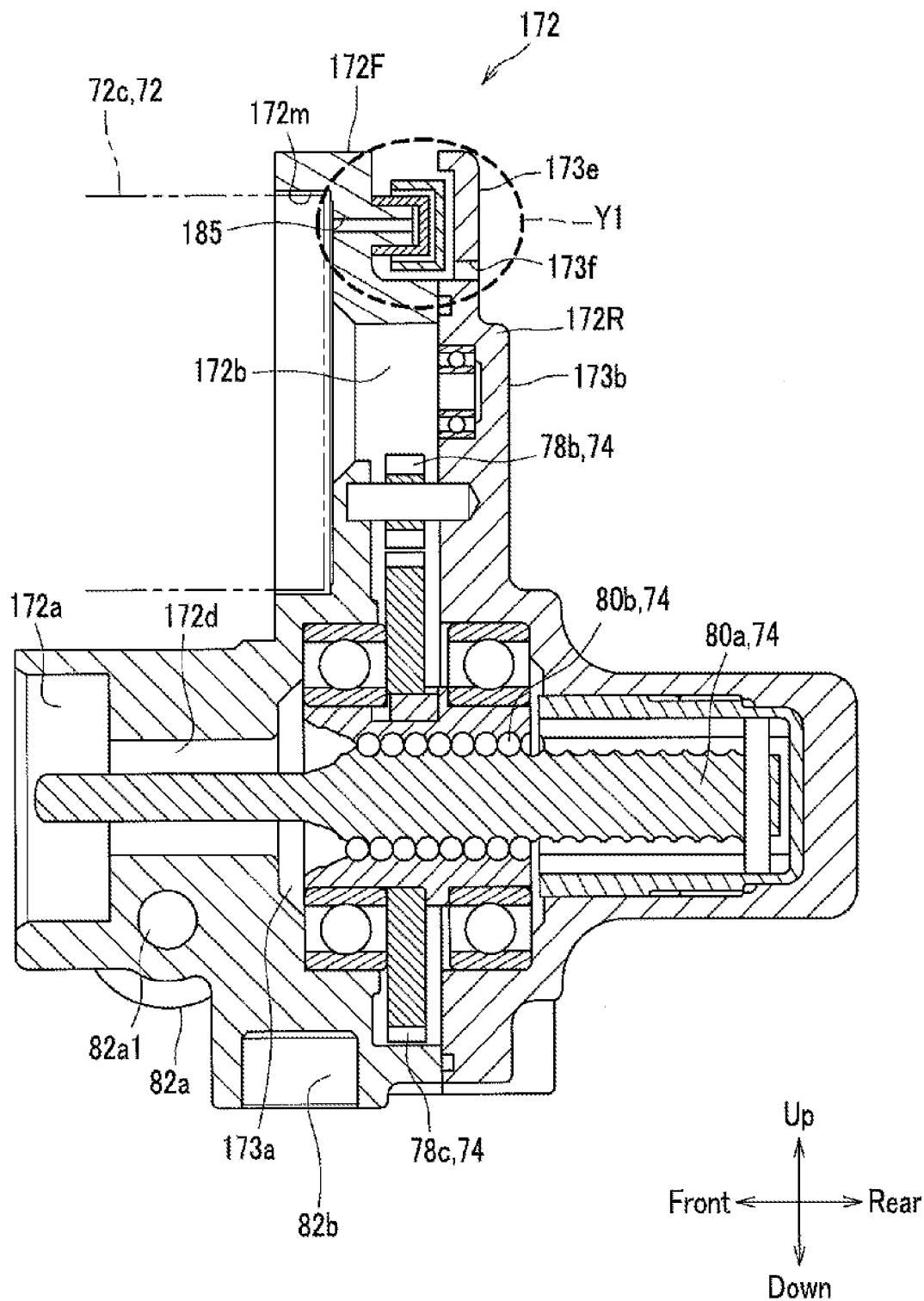
FIG. 10 is a cross-sectional view of an intake/exhaust hole formed in the motor-enclosing portion.

Further alternatively, as illustrated in FIG. 10, the intake/exhaust mechanism may include as an intake/exhaust hole 185 a communication hole which realizes communication between the atmosphere and a motor-enclosing portion 172m, which is formed in the housing body 172F of the actuator housing 172 for enclosing an end portion of the main body 72c of the electric motor 72. For example, in the case where the forward side of the first gear room 172b is formed to have an increased diameter and the motor-enclosing portion 172m communicates with the mechanism-enclosing portion 173a through the first gear room 172b, the mechanism-enclosing portion 173a communicates with the atmosphere through the first gear room 172b, the motor-enclosing portion 172m, and the intake/exhaust hole 185.

Figure 11A:
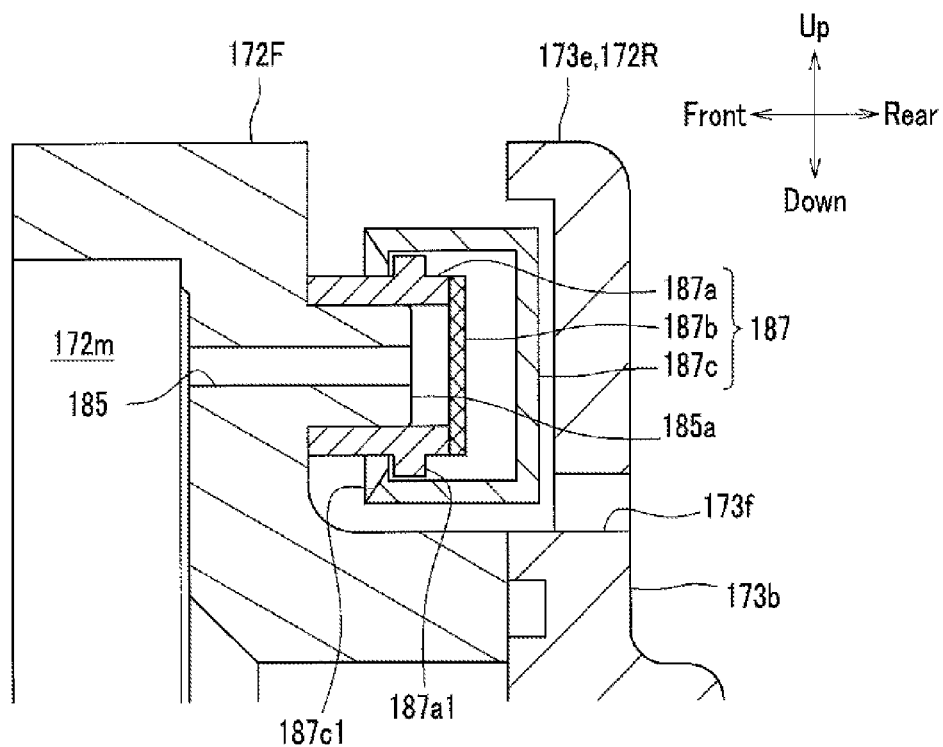
FIG. 11A is a magnified view of the Y1 portion in FIG. 10.

Preferably, the intake/exhaust hole 185 is formed in a position corresponding to the motor-enclosing portion 172m through the housing body 172F in the axial direction of the output shaft 72b (illustrated in FIG. 1) of the electric motor 72, and a cylindrical protrusion is formed as a protruded portion 185a to protrude outward from the housing body 172F at the position of the intake/exhaust hole 185, as illustrated in FIG. 11A. In addition, in a preferable construction, a cover member 187 constituted by an inner cylinder 187a, a water-proof moisture-permeable film 187b, and an outer cylinder 187c is attached to the protruded portion 185a for preventing intrusion of condensed water such as rain water into the motor-enclosing portion 172m. Further, in a preferable construction, a guard portion 173e, which is an upward extension of the backside portion 173b of the housing cover 172R, limits movement of the cover member 187 along the protruded portion 185a, so that the cover member 187 does not fall off.

Figure 11B:
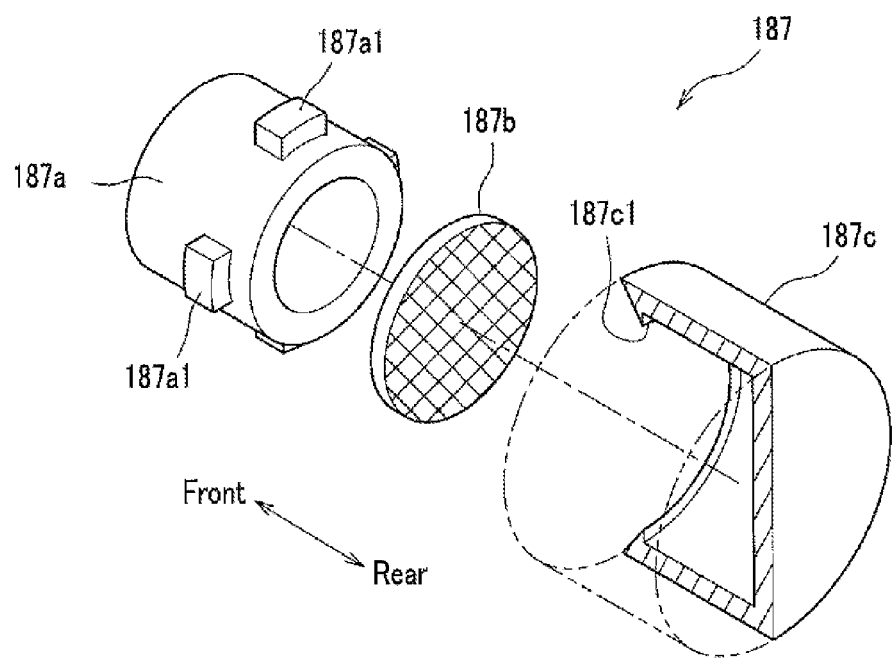
FIG. 11B is a diagram illustrating a structure of a cover member.

As illustrated in FIGS. 11A and 11B, the inner cylinder 187a in the cover member 187 according to the present embodiment has an approximately cylindrical shape and is engaged with the protruded portion 185a formed in the housing body 172F, the water-proof moisture-permeable film 187b in the cover member 187 is arranged to close one of openings of the inner cylinder 187a, and the outer cylinder 187c in the cover member 187 has a bottomed cylindrical shape and is fitted onto the inner cylinder 187a. The outer cylinder 187c is formed to have an inner diameter greater than the outer diameter of the inner cylinder 187a in such a manner that air can flow through the gap between the inner cylinder 187a and the outer cylinder 187c when the outer cylinder 187c is fitted onto the inner cylinder 187a. In addition, the water-proof moisture-permeable film 187b is attached by adhesion or the like so as to cover the opening of the inner cylinder 187a on the outer cylinder 187c side.

Further, at least one engagement protrusion 187a1 is formed around the inner cylinder 187a. Each engagement protrusion 187a1 is a protrusion formed on a portion of the outer peripheral surface of the inner cylinder 187a, and the outer diameter of the inner cylinder 187a including the at least one protrusion becomes approximately equivalent to the inner diameter of the outer cylinder 187c. Preferably, the engagement protrusion 187a1 is formed in plurality (two or more) and arranged at appropriate intervals along the outer peripheral surface of the inner cylinder 187a.

Furthermore, an engagement portion 187c1 is formed on the periphery of the outer cylinder 187c on the opening side of the outer cylinder 187c, where the outer cylinder 187c has the bottomed cylindrical shape. Specifically, the engagement portion 187c1 is formed by making the inner circumference of the opening side of the outer cylinder 187c slightly jut inward, so that when the outer cylinder 187c is fitted onto the inner cylinder 187a the engagement portion 187c1 engages with the engagement protrusions 187a1 on the inner cylinder 187a and functions as a stopper which prevents fall-off. Moreover, in the case where the opening side of the engagement portion 187c1 is formed to incline toward the closed side of the engagement portion 187c1, the outer cylinder 187c can be easily fitted onto the inner cylinder 187a.

As described above, the cover member 187 is constructed by fitting the outer cylinder 187c onto the inner cylinder 187a from the side of the of the inner cylinder 187a covered by the water-proof moisture-permeable film 187b in such a manner that the engagement portion 187c1 is engaged with the engagement protrusion(s) 187a1. Then, as illustrated in FIG. 10 and FIG. 11A, the cover member 187 is attached to the protruded portion 185a of the housing body 172F in such a manner that the protruded portion 185a is inserted into the opening of the inner cylinder 187a which is not covered by the water-proof moisture-permeable film 187b. In addition, the guard portion 173e formed in the housing cover 172R as explained before prevents fall-off of the cover member 187 from the protruded portion 185a.

At this time, the intake/exhaust hole 185 communicates with the atmosphere through the water-proof moisture-permeable film 187b, the gap between the inner cylinder 187a and the outer cylinder 187c, and the gaps between the plurality of engagement protrusions 187a1. Thus, the mechanism-enclosing portion 173a communicates with the atmosphere. Further, for example, in the arrangement in which the outer cylinder 187c is tightly fitted onto the engagement protrusion 187a1, the movement of the outer cylinder 187c fitted onto the inner cylinder 187a is limited, so that it is possible to prevent the opening of the inner cylinder 187a from being closed by the outer cylinder 187c.

As explained above, the arrangement in which the intake/exhaust hole 185 is formed through the protruded portion 185a, and the cover member 187 is attached to the protruded portion 185a prevents intrusion of condensed water such as rain water through the intake/exhaust hole 185 and the motor-enclosing portion 172m into the mechanism-enclosing portion 173a. Further, the arrangement in which the opening of the inner cylinder 187a constituting the cover member 187 is covered by the water-proof moisture-permeable film 187b prevents intrusion of condensed water with higher reliability.

In addition, since the part in which the protruded portion 185a is formed opens upward as illustrated in FIG. 10, condensed water such as rain water which falls from upside can gather in the part. Therefore, it is possible to use, for example, a structure in which a drain hole 173f is formed in the guard portion 173e (which is formed in the housing cover 172R) as illustrated in FIG. 11A for preventing the gathering of the condensed water.

Further, since the electric motor 72 is arranged above the cylinder body 82, the motor-enclosing portion 172m (in which the electric motor 72 is enclosed) is formed above the cylinder body 82 as illustrated in FIG. 10. Therefore, the intake/exhaust hole 185, which is formed in the motor-enclosing portion 172m, comes to be formed above the cylinder body 82, and therefore the intake/exhaust hole 185 is formed above the guide piston 90c (illustrated in FIG. 1). In other words, the opening of the intake/exhaust hole 185 on the mechanism-enclosing portion 173a side is formed above the guide piston 90c. According to the above arrangement, even when the brake fluid with which the cylinder body 82 is filled flows beyond the guide piston 90c to the actuator housing 172 side, the intake/exhaust hole 185 is not closed by the brake fluid, so that air can be taken into and exhausted from the mechanism-enclosing portion 173a, and maintain the inside of the mechanism-enclosing portion 173a at the atmospheric pressure.

Alternatively, it is possible to attach a water-proof moisture-permeable film so as to cover the opening of the intake/exhaust hole 185 without attaching the cover member 187 as illustrated in FIG. 11A. According to the above arrangement, it is possible to form, with a simpler construction, an intake/exhaust hole which can prevent intrusion of condensed water.

As explained above, the electric brake device 16 (illustrated in FIG. 1) according to the present embodiment is provided with an intake/exhaust mechanism including the intake/exhaust hole 179 which realizes communication between the mechanism-enclosing portion 173a and the atmosphere. Therefore, when the pressure in the mechanism-enclosing portion 173a decreases, external air is taken into the mechanism-enclosing portion 173a through the intake/exhaust hole 179, so that the pressure inside the mechanism-enclosing portion 173a can be maintained at the atmospheric pressure. In addition, it is possible to prevent occurrence of seal imperfection in the guide piston 90c (illustrated in FIG. 1) and the like.

Incidentally, in some cases, the pressure in the mechanism-enclosing portion 173a illustrated in FIG. 1 can vary with movement of the ball-screw structure 80 and temperature change inside the mechanism-enclosing portion 173a. Specifically, when the temperature inside the mechanism-enclosing portion 173a falls, for example, because of a fall in the ambient temperature of the electric brake device 16, the pressure in the mechanism-enclosing portion 173a decreases. On the other hand, when the temperature inside the mechanism-enclosing portion 173a rises, for example, because of a rise in the ambient temperature of the electric brake device 16, the pressure in the mechanism-enclosing portion 173a increases.

Since the electric brake device 16 (illustrated in FIG. 1) according to the present embodiment is provided with the intake/exhaust mechanism including the intake/exhaust hole 179 illustrated in FIG. 6, even when the temperature inside the mechanism-enclosing portion 173a changes, air can be taken into and exhausted from the mechanism-enclosing portion 173a, so that the pressure inside the mechanism-enclosing portion 173a can be maintained at the atmospheric pressure. In addition, it is possible to prevent occurrence of seal imperfection in the guide piston 90c (illustrated in FIG. 1) and the like.

Further, the position of the intake/exhaust hole for realizing communication between the mechanism-enclosing portion 173a and the atmosphere is not limited to the position of the intake/exhaust hole 179 illustrated in FIG. 6, the position of the intake/exhaust hole 181 illustrated in FIG. 7, the position of the intake/exhaust hole 183 illustrated in FIG. 9, and the position of the intake/exhaust hole 185 illustrated in FIG. 10. However, for example, in the case where the atmosphere-side opening of the intake/exhaust hole opens upward, the opening can be closed by condensed water such as rain water which falls from upside and air flow can be obstructed. Therefore, it is preferable that the intake/exhaust hole be formed at a position at which the intake/exhaust hole is unlikely to be closed by the rain water and the like which falls from upside.

On the other hand, for example, in the case where one or more openings of one or more intake/exhaust holes on the mechanism-enclosing portion 173a side open below the actuator mechanism 74 (illustrated in FIG. 1), the one or more openings can be closed by lubricant which falls from the gear mechanism 78 or the like. Therefore, it is preferable that one or more intake/exhaust holes be formed at one or more positions at which the one or more openings are unlikely to be closed by the lubricant which falls from the gear mechanism 78 or the like.

LIST OF REFERENCES

1 Vehicle
10 Vehicle Brake System
12 Brake Pedal (Brake Manipulation Unit)
14 Input Unit
16 Electric Brake Device
72 Electric Motor
72b Output Shaft
74 Actuator Mechanism
82 Cylinder Body
82a1 Attachment Hole (Insertion Hole)
88a Second Slave Piston (Hydraulic Control Piston)
88b First Slave Piston (Hydraulic Control Piston)
90c Guide Piston (Sealing Member)
94a Second Back Chamber (Portion Filled with Brake Fluid)
94b First Back Chamber (Portion Filled with Brake Fluid)
98a Second Hydraulic Chamber (Portion Filled with Brake Fluid)
98b First Hydraulic Chamber (Portion Filled with Brake Fluid)
172 Actuator Housing
173a Mechanism-enclosing Portion
179, 181, 183, 185 Intake/Exhaust Hole (Communication Hole)
179a, 181a, 183a, 187b Water-proof Moisture-permeable Films (Films of Material with Water Proofing Property and Moisture Permeability Property)
206 Bolt Members (Attachment Fastening Members)

The invention claimed is:

1. An electric brake device in which a brake pressure is generated by actuating, by a rotational driving force of an electric motor, a hydraulic control piston enclosed in a cylinder body, and an actuator housing including a mechanism-enclosing portion which encloses an actuator mechanism converting the rotational driving force around an output shaft of the electric motor into a linear driving force of the hydraulic control piston is connected to the cylinder body, and a brake-fluid enclosing portion in the cylinder body is partitioned off from the mechanism-enclosing portion with a sealing member, wherein the electric brake device comprises a communication hole which realizes communication between the mechanism-enclosing portion and atmosphere.

2. The electric brake device according to claim 1, wherein flow of condensed water in the communication hole is blocked with a film of a material which has a water proofing property and a moisture permeability property and through which air can pass.

3. The electric brake device according to claim 1, wherein the communication hole is formed to realize communication between the mechanism-enclosing portion and an insertion hole into which an attachment fastening member for fixing the actuator housing to a vehicle is inserted.

4. The electric brake device according to claim 1, wherein an opening of the communication hole on the mechanism-enclosing portion side is formed vertically above the sealing member.

5. The electric brake device according to claim 3, wherein an opening of the communication hole on the mechanism-enclosing portion side is formed vertically above the sealing member.

6. The electric brake device according to claim 2, wherein the communication hole is formed to realize communication between the mechanism-enclosing portion and an insertion hole into which an attachment fastening member for fixing the actuator housing to a vehicle is inserted.

7. The electric brake device according to claim 2, wherein an opening of the communication hole on the mechanism-enclosing portion side is formed vertically above the sealing member.

* * * * *